United States Patent [19]
Muranaga et al.

[11] Patent Number: 5,671,428
[45] Date of Patent: Sep. 23, 1997

[54] COLLABORATIVE DOCUMENT PROCESSING SYSTEM WITH VERSION AND COMMENT MANAGEMENT

[75] Inventors: Tetsuro Muranaga; Takashi Moriyasu, both of Kanagawa-ken, Japan

[73] Assignee: Kabushiki Kaisha Toshiba, Kawasaki, Japan

[21] Appl. No.: 936,844

[22] Filed: Aug. 28, 1992

[30] Foreign Application Priority Data

Aug. 28, 1991 [JP] Japan .................................... 3-215773
Oct. 22, 1991 [JP] Japan .................................... 3-274259
Jan. 10, 1992 [JP] Japan .................................... 4-002575

[51] Int. Cl.$^6$ ............................................... G06F 15/00
[52] U.S. Cl. ......................... 395/772; 395/773; 395/329
[58] Field of Search .................................... 395/144–146, 395/148, 772, 773, 329; 364/419.1, 419.19

[56] References Cited

U.S. PATENT DOCUMENTS

| | | | |
|---|---|---|---|
| 4,809,170 | 2/1989 | Leblang et al. | 395/700 |
| 4,912,637 | 3/1990 | Sheedy et al. | 395/600 |
| 5,008,853 | 4/1991 | Bly et al. | 395/153 |
| 5,047,918 | 9/1991 | Schwartz et al. | 395/600 |
| 5,132,900 | 7/1992 | Gilchrist et al. | 364/419.19 |
| 5,159,669 | 10/1992 | Trigg et al. | 395/159 |
| 5,193,185 | 3/1993 | Lanter | 395/600 |
| 5,220,657 | 6/1993 | Bly et al. | 395/425 |
| 5,299,122 | 3/1994 | Wang et al. | 364/419.1 |

OTHER PUBLICATIONS

T. Catlin, et al., Hypertext '89 Proceedings, Nov. 1989, pp. 365–378. "InterNote: Extending a Hypermedia Framework to Support Annotative Collaboration".

N. Delisle, et al., ACM Transaction on Office Information Systems, Apr. 1987, pp. 168–186. "Contexts—A Partitioning Concept for Hypertext".

Fish et al., "Quilt: a collaborative tool for cooperative writing", COIS '88, pp. 30–37 (1988).

Greif et al., "Data Sharing in Group Work", CSCW '86, pp. 175–183 (1986).

Lewis et al., "Shared Books: Collaborative publication management for an office environment", COIS '88, pp. 197–204, (1988).

Seliger et al., "Atomic Data Abstractions in a Distributed Collaborative Editing System", Proceedings of ACM Symposium on Principles of Programming Languages pp. 160–172 (1986).

*Full Write Professional: A User's Guide*, Ashton–Tate Corp., pp. 99–122 (1988).

Leland et al., "Collaborative Document Production Using Quilt", CSCW '88, pp. 206–215 (1988).

*Primary Examiner*—Heather R. Herndon
*Assistant Examiner*—Joseph R. Burwell
*Attorney, Agent, or Firm*—Oblon, Spivak, McClelland, Maier & Neustadt, P.C.

[57] ABSTRACT

A document processing system capable of providing an environment for a smooth and efficient collaborative document processing work. In the system, the document in the new and old versions, the comment attached to the document, and version data indicating a modification made in the document between the new version and the old version are managed by being linked together.

14 Claims, 42 Drawing Sheets

FIG.5

```
┌─────────────────────────────────────────────────────┐
│ COMMENT EDITOR          COMMENT NO.101              │~ CA
├─────────────────────────────────────────────────────┤
│ DATE         : 1991. 3. 29                          │
│ COMMENTATOR  : MORIMOTO                             │
│ DOCUMENT     : COLLABORATIVE DOCUMENT PROCESSING SYSTEM │~ CB
│ TARGET       : EDITOR UNIT                          │
│ TYPE         : SUGGESTION FOR MODIFICATION          │
├─────────────────────────────────────────────────────┤
│  [Document] [Comment] [Type] [Close] [Done]         │~ CC
├─────────────────────────────────────────────────────┤
│ The meaning of the editor unit is                   │
│ ambiguous, isn't it ?▲                              │~ CD
│                                                     │
└─────────────────────────────────────────────────────┘
```

FIG.6A

Document
→ Attached / Influenced

FIG.6B

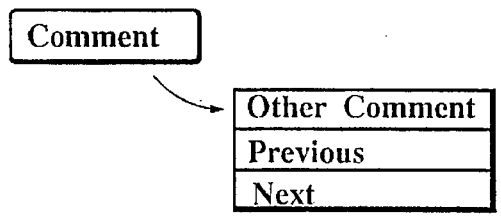

FIG.6C

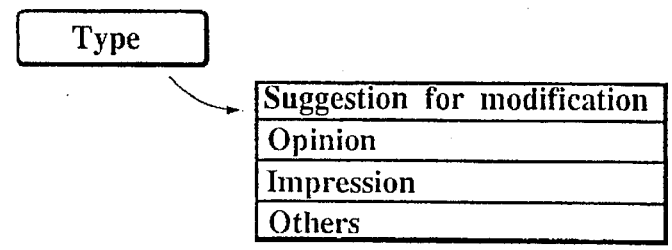

FIG.7
| VERSION DATA NO.105 | DOCUMENT NAME : COLLABORATIVE DOCUMENT PROCESSING SYSTEM | ~VA |
DATE           : 1991. 4. 7.
MODIFIER       : MURATA
REFERENCE COMMENT : No.101
RESPONSE COMMENT  : No.110     ~VB
[ Comment ] [ Version ]     [ Close ] [ Done ]   ~VC
The meaning is ambiguous, as pointed out.
It is modified as follows.    ~VD
editor unit→unified editor unit   ~VE
FIG.8A
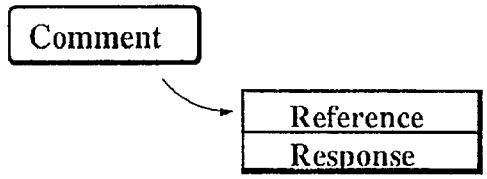
FIG.8B
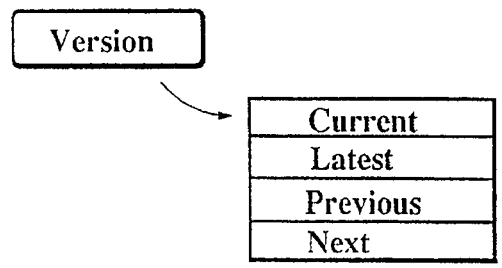

DOCUMENT STRUCTURE UNIT

| Field | Value | |
|---|---|---|
| ID : | 10 | (DOCUMENT ID) |
| SIZE : | 3500 | |
| TYPE : | CHAR | |
| NAME : | — | "COLLABORATIVE DOCUMENT PROCESSING SYSTEM" |
| CREATOR : | — | "MURATA" |
| MODIFIER : | — | "MURATA" |
| CREATE—DATE : | — | "1991. 3. 25." |
| MODIFY—DATE : | — | "1991. 4. 7." |
| CONTENTS : | — | → DOCUMENT |
| ATTACHED—COMMENT : | — | (15) ⎫ (LIST OF |
| INFLUENCED—COMMENT : | — | (19) ⎭ COMMENT ID) |
| VERSION : | 10 | (VERSION DATA ID) |

FIG.11

COMMENT STRUCTURE UNIT

| Field | Value | |
|---|---|---|
| ID: | 15 | (COMMENT ID) |
| SIZE: | 150 | |
| TYPE: | → | "SUGGESTION FOR MODIFICATION" |
| DATE: | → | "1991. 3. 29" |
| COMMENTATOR: | → | "MORIMOTO" |
| CONTENTS: | → | COMMENT |
| ATTACH—DOCUMENT: | → (10) | (LIST OF DOCUMENT ID) |
| INFLUENCE—DOCUMENT: | → (11) | |

FIG.12

VERSION STRUCTURE UNIT

| Field | Value | |
|---|---|---|
| ID: | 10 | (VERSION DATA ID) |
| SIZE: | 200 | |
| TYPE: | CHAR | |
| DATE: | → | "1991. 3. 25" |
| CREATOR: | → | "MURATA" |
| ROOT—VERSION: | 1 | |
| LATEST—VERSION: | 12 | (VERSION DATA ID) |
| PREVIOUS—VERSION: | 9 | |
| NEXT—VERSION: | 11 | |
| DOCUMENT: | 10 | (DOCUMENT ID) |
| EXPLANATION: | → | SUPPLEMENTARY EXPLANATION |
| MODIFICATION: | → | MODIFICATION DATA |

FIG.13

| DOCUMENT NAME | ROOT-VERSION DOCUMENT ID | LATEST-VERSION DOCUMENT ID |
|---|---|---|
| " COLLABORATIVE DOCUMENT PROCESSING SYSTEM" | 1 | 12 |
| ⋮ | ⋮ | ⋮ |

FIG.14A

DOCUMENT EDITOR ID     ACTIVATED COMMENT EDITOR ID

| 1000 | → | (2000, 2001) |
| 1010 | → | ( ) |
| 1005 | → | (2000) |
| 1007 | → | (2015, 2002) |

MOST RECENTLY ACCESSED DOCUMENT EDITOR → 1007

END OF TABLE

FIG.14B

COMMENT EDITOR ID

| 2000 |
| 2001 |
| 2002 |
| 2015 |

MOST RECENTLY ACCESSED COMMENT EDITOR → 2002

END OF TABLE

FIG.25

Unit ID : 100206
Unit Type : User
User Name : Taro Tanaka
Member Of : 2nd Section, Safety Committee
Edit Conditions : (eq (get User) (get "2nd Section" Chief))
. . .   . . .

FIG.26

Unit ID : 100544
Unit Type : User Group
Group Name : 2nd Section
Chief : Hiroshi Suzuki
Belongs TO : Programming Dept.
Has Members : Hiroshi Suzuki, Taro Tanaka,
Kenji Yamaguchi, · · ·
Edit Conditions : (eq (get User) (get "Programming Dept" Chief))
. . .   . . .

FIG.27

Unit ID : 102043
Unit Type : Manual
Document Title : J3900 Manual
Authors : Taro Tanaka, Kenji Yamaguchi,
Toshio Watanabe
Has Chapter : Introduction, Summary of J3900,
Window System, · · ·
Read Cond : (is Member (get User) (get "2nd Section"
Has Members))
Delete Conditions : (majority Rule (get "2nd Section"
Has Members) Agree)
. . . . .  . . .

FIG.28

Unit ID : 102050
Unit Type : Chapter
Chapter Title : Window System
Chapterof : J3900 Manual
Authors : Taro Tanaka
Has Sections : Window Server, Window Manager · · ·
· · · · · ·

FIG.29

Unit ID : 002335
Unit Type : Class
Class Name : Chapter
Default Edit
    Conditions : (is Member (get User) (get (get Self) Authors))
· · · · · ·

FIG.30

Unit ID : 302377
Unit Type : Proposition
Exec Type : Delete
Proposed by : Taro Tanaka
Target : J3900 Manual
Prop Date : 1991 : 05 : 12 : 15 : 32
Vote Req Message : "Shall we delete it as it is
                   no longer necessary ?"
Votes : [Taro Tanaka, Agree, 1991 : 05 : 12 : 15 : 32]
        [Kenji Yamaguchi,
                Disagree, 1991 : 05 : 12 : 15 : 45]
· · · · · ·

FIG.36A

```
        ID : U011001
      Type : Text
     Title : Takamiyuratake
 Text Data : A dark brown mushroom resembling
             Matsutake. For food. Very similar to
             Takamidokutake. · · ·
 Relations : · · · , R110001, R110002, R110003, · · ·
    Method : In a case of editing, the corresponding portions
             of the relation units must be changed.
```

FIG.36B

```
        ID : U011002
      Type : Text
     Title : Takamidokutake
 Text Data : A dark brown mushroom resembling
             Matsutake. Poisonous. Very similar to
             Takamidokutake. · · ·
 Relations : · · · , R110001, R110002, R110003, · · ·
             · · ·
```

FIG.36C

```
        ID : U012001
      Type : Text
     Title : A manner of distinguishing Takamiyuratake
             and Takamidokutake.
 Text Data : Takamiyuratake has a stem that can be torn
             sharply by hands, whereas Takamidokutake has
             a stem that cannot be torn sharply by hands.
 Relations : · · · , R110003, · · ·
             · · ·
```

FIG.37A

```
ID : R110001
Type : Reference
Reference Source : (U011001 Text Data 10.14)
Reference Target : (U011002)
          . . .
```

FIG.37B

```
ID : R110002
Type : Reference
Reference Source : (U011002 Text Data 10.14)
Reference Target : (U011001)
          . . .
```

FIG.37C

```
ID : R110003
Type : Comparison
Comparison Target : (U011001 Text Data 10.7)
                    (U011002 Text Data 9.7)
Comparison Content : (U012001)
          Method : In a case of editing any of U011001,
                   U01102, and U012001,
   . . .          all three must be displayed.
```

FIG.42A

```
       ID : U013001
     Type : Text
    Title : Ezoakafukurou
Text Data : A bird of prey in the owl family with approximately 40cm
            body length. It makes a nest on a tree such as a fir
            or a hemlock spruce.
            In summer, it is covered with feathers having stripes
            in brown, but in winter, it is covered with feathers
            in white entirely.
            . . .
Relations : · · · , R200001, · · ·
   . . .
```

FIG.42B

```
       ID : U013002
     Type : Text
    Title : Higetobiusagi
Text Data : It is distributed all over the Takami highland.
            It has approximately 40cm body length,
            and distinguished by its long black whiskers.
            . . .
Relations : · · · , R200001, R200002, · · ·
   . . .
```

FIG.42C

```
         ID : U013003
       Type : Text
      Title : Takamiusuyukisou
  Text Data : An alpine plant in the chrysanthemum family, which is
              a near relative of the edelweiss.
              It blooms with small white flowers in July.
                 . . .
  Relations :  · · · , R200002, · · ·
                 . . .
```

FIG.42D

```
         ID : U013005
       Type : Text
      Title : The ecological system of the Takami highland
  Text Data : In the Takami highland, many animals and plants
              that cannot be seen in anywhere else can be observed,
              and they form a unique ecological system.
                 . . .
  Relations :  · · · , R200005, · · ·
                 . . .
```

FIG.43A

```
           ID : R200001
         Type : Food chain relationship
That which eats : (U013001)
That which is eaten : (U013002)
    Relations : R200005
        . . .
```

FIG.43B

```
           ID : R200002
         Type : Food chain relationship
That which eats : (U013002)
That which is eaten : (U013003)
    Relations : R200005
        . . .
```

FIG.43C

```
              ID : R200005
            Type : Reference
Reference Source : (U013005 Text Data 23.22)
Reference Target : (R200001 Structure) (R200002 Structure)
        . . .
```

COLLABORATIVE DOCUMENT PROCESSING SYSTEM WITH VERSION AND COMMENT MANAGEMENT

BACKGROUND OF THE INVENTION

1. Field of the Invention

The present invention relates to a document processing system for writing, editing, and managing documents, which is particularly suitable for a collaborative document processing work to be carried out by a plurality of users.

2. Description of the Background Art

Conventionally, a document processing system has been designed to be used for writing, editing, and managing the documents by each user separately, so that there has been the following problems in a case of a collaborative document processing work to be carried out by a plurality of users.

(1) In a case of writing a document by assigning different parts of the document to each collaborating author, in order to make a coordination of the different parts of the document written by different authors, it is often necessary for each author to make an electronic copy of the assigned part of the document to be sent through an electronic mail or a print out of the assigned part of the document on papers, so as to put the different parts of the document written by different authors together into one document. However, such a work required in relation to the coordination of the different parts of the document is extremely tedious. In addition, when there is a section which appears repeatedly in different parts of the document, many different versions of this same section are produced by different authors, and all of these different versions but one are going to be discarded in a process of making the coordination throughout the entire document, so that there is a great amount of waste involved in such a collaborative document production work.

(2) In a case in which a plurality of proofreaders are is going to check the document, the copies of the document must be distributed among these proofreaders, and then after the comments are written into the distributed copies of the document by each proofreader, the copies of the document containing these comments must be distributed among the authors or editors. However, such work required in relation to the proofreading of the document and the comment annotation is extremely tedious to handle manually.

(3) In a case of disclosing a part of the document to persons other than the assigned author, that part of the document must be copied as a separate document, and the permission for reading this separate document containing the disclosed part must be given to each person to whom the disclosure is intended. However, such a work required in relation to the disclosure of a part of the document is quite tedious, as well as wasteful in a sense that many copies of the same part must be produced.

(4) In a case the document is managed electronically, there are cases in which an execution of a specific electronic operation on the document is to be permitted or prohibited only to limited persons under the specific conditions. However, in order to achieve such a controlling of the execution of the operations in the system, it has been necessary conventionally to provide a specially programmed software program for each controlling to be made, separately.

(5) In a case of executing a document processing operation which affects the works of a plurality of authors, such as a modification of a part of the document under the collaborative document processing work, it is often necessary to notify the execution of such a document processing operation to the other authors who can be affected. However, such a work of notification is quite tedious and often forgotten to cause the trouble in the collaborative document processing work.

(6) There are cases in which it is necessary to make a group decision concerning the document written in collaboration among a plurality of collaborating authors according to a predetermined procedure such as the decision by majority. In such a case, the group decision must be made by the collaborating authors first, and then the system must be controlled manually to take the group decision made by the collaborating authors into account. However, such a group decision making process and a work for incorporating the result of the group decision have been quite inconvenient.

In short, these problems enumerated above are caused by the fact that a conventional document processing system does not possess a function to control the various processings executable in the system under the minutely defined processing conditions, because the processings available to the users have been basically limited to three types of "read", "write", and "execute" in a conventional document processing system.

More recently, there has been proposals for document processing systems for writing, editing, and managing documents, suitable for a collaborative document processing work to be carried out by a plurality of authors. For example, there is a system proposed by T. Catlin et al. in "InterNote: Extending a Hypermedia Framework to Support Annotative Collaboration", Hypertext '89 Proceedings, November 1989, which discloses examples of a hypertext system which is capable of attaching comments by the authors to the document.

However, in such a conventional document processing system, the version information of the revised document and the comments attached to the processed document have been managed quite separately.

For this reason, in a case the revision has been made to a document to be written in collaboration, there has been a case in which it is impossible for one of the collaborating authors to properly comprehend the reason for making the revision or the source of the decision for making the revision, because it has been impossible in a conventional document processing system to present the comments by the other collaborating authors in relation to the document.

Moreover, even when the appropriate comments are attached to the document, there has also been a case in which it is difficult for one of the collaborating authors to recognize exactly how these comments are reflected in the revised version of the document.

In other words, a conventional document processing system has been insufficient for fully supporting the collaborative document processing work, because the conventional document processing system has only a very limited communication facility among the collaborating authors.

In addition, in a conventional hypertext system used as a document processing system, a relationship using a data unit or a part of the data in the data unit as an anchor has been expressed as a two-term relationship using directed or non-directed links, so that it has been impossible to express a multi-term relationship concerning more than two data units or more than two parts of the data in the data units. For this reason, even when there is a multi-term relationship among one parent unit and two child units sharing the same parent unit, it has been impossible to make a direct reference from one of the child units to another one of the child units having the same parent unit, and consequently the operation for looking up the reference has been very cumbersome in a conventional hypertext system.

Moreover, in a conventional hypertext system, it has also been impossible to express a meta-level relationship among structures, where each structure is specified in terms of data units or parts of data units which are mutually related to each other by links representing the relationships. For this reason, it has been impossible in a conventional hypertext system to relate a data unit with a structure in which a plurality of other data units are related by links.

Thus, in a conventional hypertext system, the relationships that can be dealt with in the system have been severely limited, and this in turn has severely limited the capacity of the system as a document processing system.

SUMMARY OF THE INVENTION

It is therefore an object of the present invention to provide a document processing system capable of realizing the sufficient communication facility among the collaborating authors, such that the collaborative document processing work can be realized more smoothly and efficiently.

It is another object of the present invention to provide a document processing system capable of providing an environment for a smooth and efficient collaborative work by a plurality of users.

It is another object of the present invention to provide a document processing system capable of dealing with multi-term relationships among different parts of a document to be processed.

It is another object of the present invention to provide a document processing system capable of dealing with meta-level relationships among different structures in a document to be processed.

According to one aspect of the present invention there is provided a document processing system, comprising: editor means for writing, editing and displaying a document to be revised from an old version to a new version, and a comment to be attached to the document; and data managing means for retrieving and storing document data in which the document in the new and old versions, the comment attached to the document, and version data indicating a modification made in the document between the new version and the old version are linked together.

According to another aspect of the present invention there is provided a document processing system, comprising: execution means for executing a processing on a document; execution condition specifying means for specifying execution conditions for the processing to be executed by the execution means; and execution condition verification means for verifying the execution conditions specified by the execution condition specifying means, and controlling an execution of the processing at the execution means according to a result of a verification of the execution conditions.

According to another aspect of the present invention there is provided a document processing system, comprising: memory means for storing data units representing documents to be processed, and relation units expressing multi-term relationships among the data units; control means for retrieving one of the relation units expressing a specific multi-term relationship for a specific data unit in the memory means, to retrieve related data units which are related to the specific data unit through the specific multi-term relationship; and display means for simultaneously displaying the specific data unit and the related data units retrieved by the control means, along with an indicator for indicating the specific multi-term relationship.

According to another aspect of the present invention there is provided a document processing system, comprising: memory means for storing data units representing documents to be processed, and relation units expressing meta-level relationships among the data units and structures formed by the data units; control means for retrieving one of the relation units expressing a specific meta-level relationship for a specific structure in the memory means, to retrieve related data units and structures which are related to the specific structure through the specific meta-level relationship; and display means for simultaneously displaying the specific structure and the related data units and structures retrieved by the control means, along with an indicator for indicating the specific meta-level relationship.

Other features and advantages of the present invention will become apparent from the following description taken in conjunction with the accompanying drawings.

BRIEF DESCRIPTION OF THE DRAWINGS

FIG. 5 is an illustration of an exemplary display window for a comment editor in the document processing system of FIG. 1.

FIGS. 6A, 6B, and 6C are illustrations of various commands provided in a comment editor in the document processing system of FIG. 1, which are to be selected by using button icons provided in the display window of FIG. 5.

FIG. 7 is an illustration of an exemplary display window for a version data display unit in the document processing system of FIG. 1.

FIGS. 8A and 8B are illustrations of various commands provided in a version data display unit in the document processing system of FIG. 1, which are to be selected by using button icons provided in the display window of FIG. 7.

FIG. 11 is a diagram of a data structure for a "Comment" structure unit representing a comment node in the data model representation of FIG. 9.

FIG. 12 is a diagram of a data structure for a "Version" structure unit representing a version data node in the data model representation of FIG. 9.

FIG. 13 is a diagram of a document table to be used in a document database in the document processing system of FIG. 1.

FIG. 14A is a diagram of a document editor table to be used in an editor unit in the document processing system of FIG. 1.

FIG. 14B is a diagram of a comment editor table to be used in an editor unit in the document processing system of FIG 1.

FIG. 25 is an illustration of an exemplary data for a user to be used in the document processing system of FIG. 23.

FIG. 26 is an illustration of an exemplary data for a group of users to be used in the document processing system of FIG. 23.

FIG. 27 is an illustration of an exemplary data for a document to be used in the document processing system of FIG. 23.

FIG. 28 is an illustration of an exemplary data for a document part to be used in the document processing system of FIG. 23.

FIG. 29 is an illustration of an exemplary data for a class of document parts to be used in the document processing system of FIG. 23.

FIG. 30 is an illustration of an exemplary data for a proposition of processing to be used in the document processing system of FIG. 23.

FIGS. 36A, 36B, and 36C are illustrations of exemplary data units to be used in the document processing system of FIG. 34.

FIGS. 37A, 37B, and 37C are illustrations of exemplary relation units to be used in the document processing system of FIG. 34.

FIGS. 42A, 42B, 42C, and 42D are illustrations of exemplary data units to be used in the document processing system of FIG. 34, for a case of using structures as objects of relationships.

FIGS. 43A, 43B, and 43C are illustrations of exemplary relation units to be used in the document processing system of FIG. 34, for a case of using structures as objects of relationships.

DETAILED DESCRIPTION OF THE PREFERRED EMBODIMENTS

Figure 1:
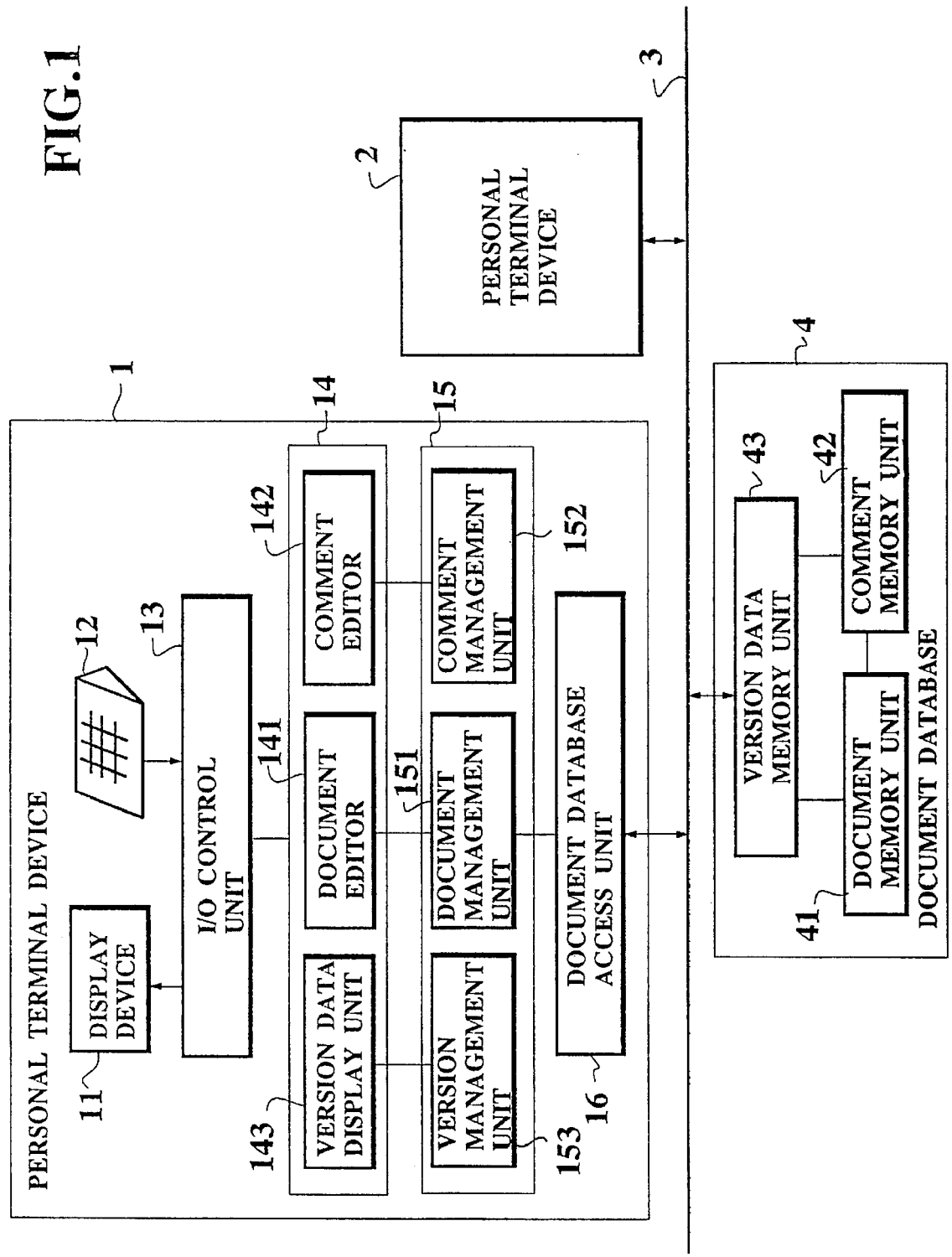
FIG. 1 is a block diagram of a first embodiment of a document processing system according to the present invention.

Referring now to FIG. 1, the first embodiment of a document processing system according to the present invention will be described in detail.

In this first embodiment, the document processing system comprises: a plurality (two in FIG. 1) of personal terminal devices 1 and 2 such as personal computers or work stations, each of which is assigned to each one of collaborating authors, and which are interconnected through a network 3; and a document database 4 connected with the personal terminal devices 1 and 2 through the network 3, which is shared by all the personal terminal devices 1 and 2. Here, the personal terminal devices 1 and 2 have the identical internal configuration, so that the internal configuration of only the personal terminal device 1 is shown in FIG. 1 and will be described in detail below.

The personal terminal device 1 further comprises: a display device 11 such as a bit map display equipped with a multiple window management function; an input device 12 such as a keyboard and a mouse; an input and output (I/O) control unit 13 connected to the display device 11 and the input device 12; an editor unit 14 connected to the input and output control unit 13, which includes a document editor 141, a comment editor 142, and a version data display unit 143; a document data management unit 15 connected to the editor unit 14, which includes a document management unit 151, a comment management unit 152, and a version management unit 153; and a document database access unit 16 connected to the document data management unit 15 and the network 3.

The document database 4 further comprises: a document memory unit 41 for storing documents to be processed; a comment memory unit 42 for storing comments to be attached to the documents stored in the document memory unit 41; and a version data memory unit 43 for storing version data for the documents stored in the document memory unit 41. The document data including the documents stored in the document memory unit 41, the corresponding comments stored in the comment memory unit 42, and the corresponding version data stored in the version data memory unit 43 can be read out to each of the personal terminal devices 1 and 2 through the network 3, and updated by the new document data newly obtained at the personal terminal device 1 and 2 through the network 3.

In this document processing system of FIG. 1, the document is processed at the editor unit 14 according to the commands given by an author through the input device 12, while the document under the processing at the editor unit 14 is displayed on the display device 11, and the document data for the document under the processing at the editor unit 14 are managed at the document data management unit 15 and stored in the document database 4 through the network 3, by maintaining the correspondences among the documents, comments, and version data.

Figure 2:
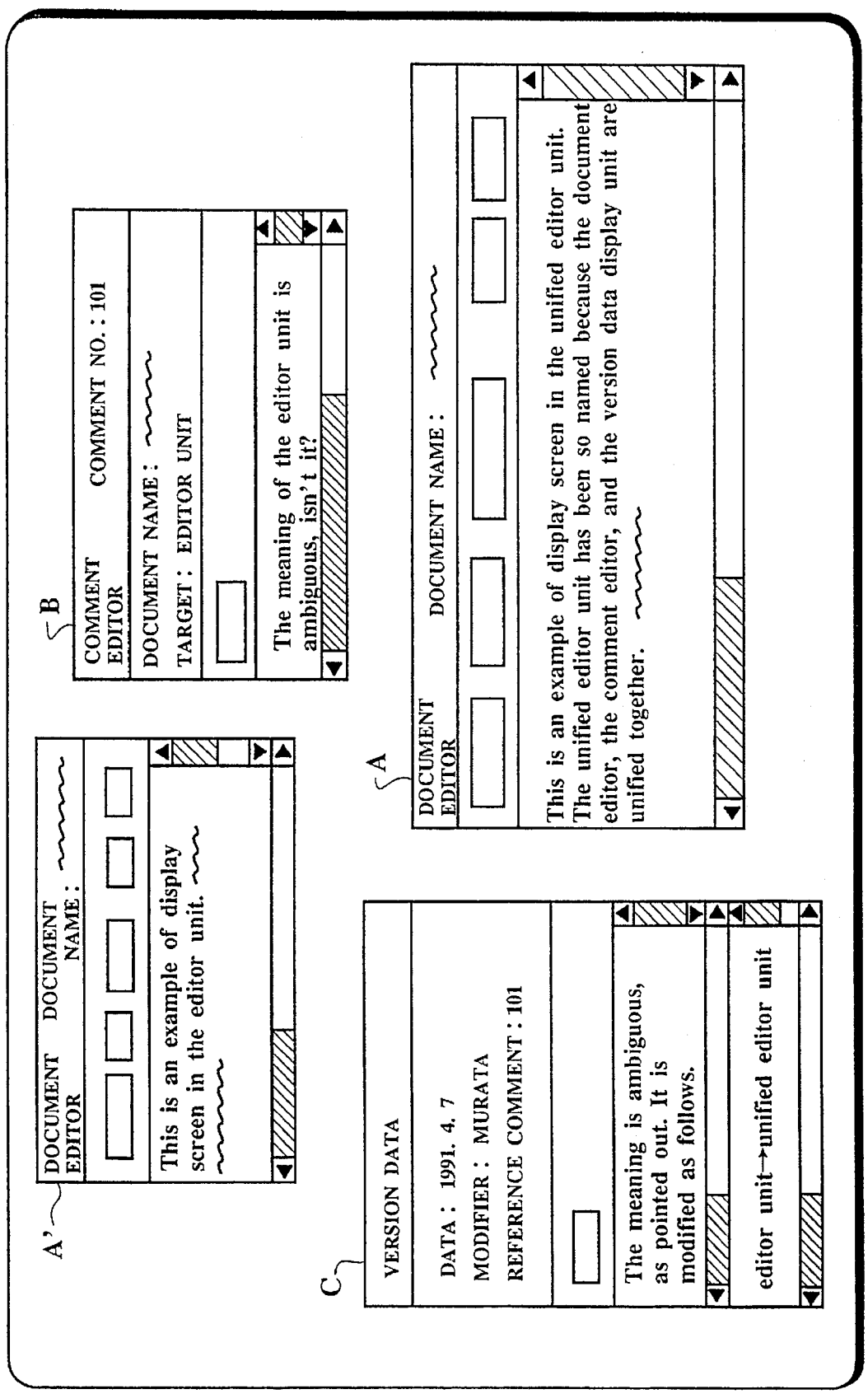
FIG. 2 is an illustration of an exemplary display of display windows on a display device in the document processing system of FIG. 1.

Referring now to FIG. 2, the operation of this first embodiment of a document processing system of FIG. 1 will be described in detail.

FIG. 2 shows an exemplary display on the display device 11 in the document processing system of FIG. 1, which includes separate windows A, B, and C for the document editor 141, the comment editor 142, and the version data display unit 143, respectively. FIG. 2 shows an example of a case in which all of these windows are opened at the same time.

In FIG. 2, the windows A and A' are showing a new version and an old version of the same document, respectively, simultaneously in parallel, while the window B is showing a comment attached to the old version of the document shown in the window A'. In this exemplary case, the comment shown in the window B indicates the reason for the modification made from the old version shown in the window A' to the new version shown in the window A. The window C is showing the version data for the old and new versions of the document shown in the windows A' and A, which indicate the modification made from the old version to the new version.

Here, any unit of the editor unit 14 can be activated from any other units of the editor unit 14. That is, for example, either one of the comment editor 142 or the version data display unit 143 can be activated from the document editor 141, and so on. In addition, any other document editor 141 showing the other document can also be activated from the editor unit 141 showing the currently processed document.

In this first embodiment, each author edits the document by using the document editor 141. During this editing processing, the author can see the older version of the currently processed document or the comment attached by the other collaborating authors, on the same display on which the currently processed document is shown. In addition, the author can attach the comment to any document written by the collaborating authors, on the same display.

The document data such as the documents, comments, and version data obtained by the processing at the editor unit 14 are managed by the document data management unit 15, and are stored in the document database 4 through the document database access unit 16 and the network 3, after the completion of the processing at the editor unit 14.

The document data stored in the document database 4 can be accessed from the personal terminal devices 1 and 2, such that the author can attach the comment to any desired document by accessing to the desired document at the document editor 141 and by using the comment editor 142.

The comment given by each author is also stored as a part of the document data in the document database 4, such that the other collaborating authors can also see the comment by accessing to the desired comment at the comment editor 142.

Thus, in this document processing system of FIG. 1, the sufficient communication among the collaborating authors can be realized by sharing the comments attached to the document which are stored in correspondence to the document in the document database 4, among all of the collaborating authors, such that the collaborative document processing work can be realized more smoothly and efficiently.

Now, the further details of the operation of this first embodiment of a document processing system of FIG. 1 will be described.

Figure 3:
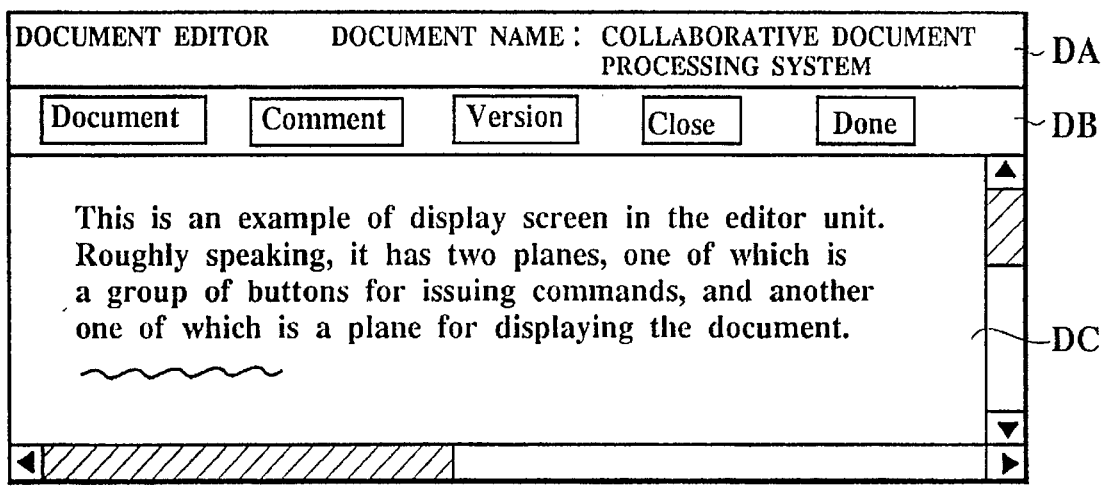
FIG. 3 is an illustration of an exemplary display window for a document editor in the document processing system of FIG. 1.

FIG. 3 shows an example of a window display for the document editor 141 in detail, which includes a region DA for indicating a document name of the document to be processed, a region DB for indicating button icons to issue various commands provided in the document editor 141, and a region DC for indicating the document to be processed, on which the editing processing such as insertion and deletion can be made.

Here, the button icons shown in the region DB can be used by moving the mouse cursor over to the desired one of the button icon and clicking the mouse button. In the example of FIG. 3, there are five button icons provided, of which [Close] is an icon for closing the window and showing the document editor 141 itself as a small window icon on the display, [Done] is an icon for terminating the document editor 141, [Document] is an icon for displaying a command menu shown in FIG. 4A, [Comment] is an icon for displaying a command menu shown in FIG. 4B, and [Version] is an icon for displaying a command menu shown in FIG. 4C.

Figure 4A:
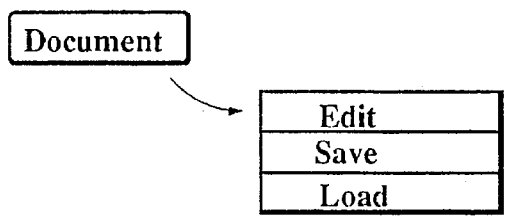
FIGS. 4A, 4B, and 4C are illustrations of various commands provided in a document editor in the document processing system of FIG. 1, which are to be selected by using button icons provided in the display window of FIG. 3.

The command menu shown in FIG. 4A to be displayed by selecting the icon [Document] contains three command entries including [Edit] to invoke the editing processing, [Save] to store the document to the document database 4, and [Load] to retrieve the document from the document database 4.

Figure 4B:
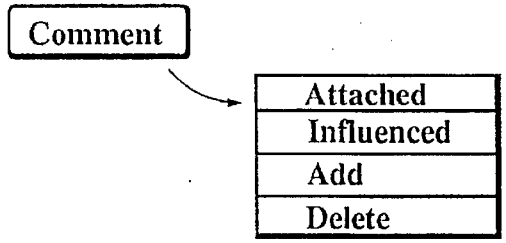

The command menu shown in FIG. 4B to be displayed by selecting the icon [Comment] for activating the comment editor 142 contains four command entries including [Attached] to read the comment attached to the document,

[Influenced] to read the comment used as a reference in writing the document (i.e., the comment by which the document has been influenced), and [Add] and [Delete] to and and delete the comment, respectively.

Figure 4C:
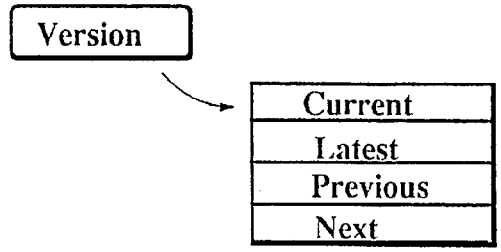

The command menu shown in FIG. 4C to be displayed by selecting the icon [Version] for activating the version data display unit 143 contains four command entries including [Current] to display the version data for the currently processed version, [Latest] to display the version data for the latest version, and [Previous] and [Next] to display the version data for the previous and next versions of the present version, respectively.

FIG. 5 shows an example of a window display for the comment editor 142 in detail, which includes a region CA for indicating a comment number assigned to each comment, a region CB for indicating information concerning the date, commentator, document, target, and type of the comment, a region cc for showing button icons to issue various commands provided in the comment editor 142, and a region CD for indicating the actual comment, where the comment can be edited in this region CD.

In this example of FIG. 5, the region CB indicates the comment of a type "Suggestion for modification" directed toward the target "Editor unit" in the document "Collaborative document processing system" is given by the commentator "Morimoto" on the date "Mar. 29, 1991".

Here, the button icons shown in the region CC can be used by moving the mouse cursor over to the desired one of the button icon and clicking the mouse button. In the example of FIG. 5, there are five button icons provided, of which [Close] is an icon for closing the window and showing the comment editor 142 itself as a small window icon on the display, [Done] is an icon for terminating the comment editor 142, [Document] is an icon for displaying a command menu shown in FIG. 6A, [Comment] is an icon for displaying a command menu shown in FIG. 6B, and [Type] is an icon for displaying a command menu shown in FIG. 6C.

The command menu shown in FIG. 6A to be displayed by selecting the icon [Document] contains two command entries including [Attached] to display the document to which the comment is attached, and [Influenced] to display the document influenced by the comment.

The command menu shown in FIG. 6B to be displayed by selecting the icon [Command] contains three command entries including [Other comment] to show the other comment attached to the document, and [Previous] and [Next] to display the previous and next comments of the present comment, respectively.

The command menu shown in FIG. 6C to be displayed by selecting the icon [Type] which contains four command entries indicating different types of the commands, including [Suggestion for modification], [Opinion], [Impression], and [Others].

FIG. 7 shows an example of a window display for the version data display unit 148 in detail, which includes a region VA for indicating a version data number assigned to each version data and the document name, a region VB for indicating information concerning the date, new version creator, reference comment, and response comment, a region VC for indicating button icons to issue various commands provided in the version data display unit 143, a region VD for indicating the explanation for the modification made from the old version to the new version, and a region VE for indicating the modification made from the old version to the new version. This entry in the region VE can either be entered by the user or automatically set by the system according to the comparison of the old and new versions.

In this example of FIG. 7, the region VB indicates that the change of the version is made on the date "Apr. 7, 1991" by the new version creator "Murata" by using the reference comment "No. 101" and according to the response comment "No. 110".

Here, the button icons shown in the region VC can be used by moving the mouse cursor over to the desired one of the button icon and clicking the mouse button. In the example of FIG. 7, there are four button icons provided, of which [Close] is an icon for closing the window and showing the version data display unit itself as a small window icon on the display, [Done] is an icon for terminating the version data display unit 143, [Comment] is an icon for displaying a command menu shown in FIG. 8A, and [Version] is an icon for displaying a command menu shown in FIG. 8B.

The command menu shown in FIG. 8A to be displayed by selecting the icon [Comment] contains two command entries including [Reference] to display the comment used as the reference comment, and [Response] to display the response comment in response to the reference comment.

The command menu shown in FIG. 8B to be displayed by selecting the icon [Version] contains four command entries including [Current] to display the version data for the current version, [Latest] to display the version data for the latest version, and [Previous] and [Next] to display the version data for the previous and next versions, respectively.

Figures 9, 10:
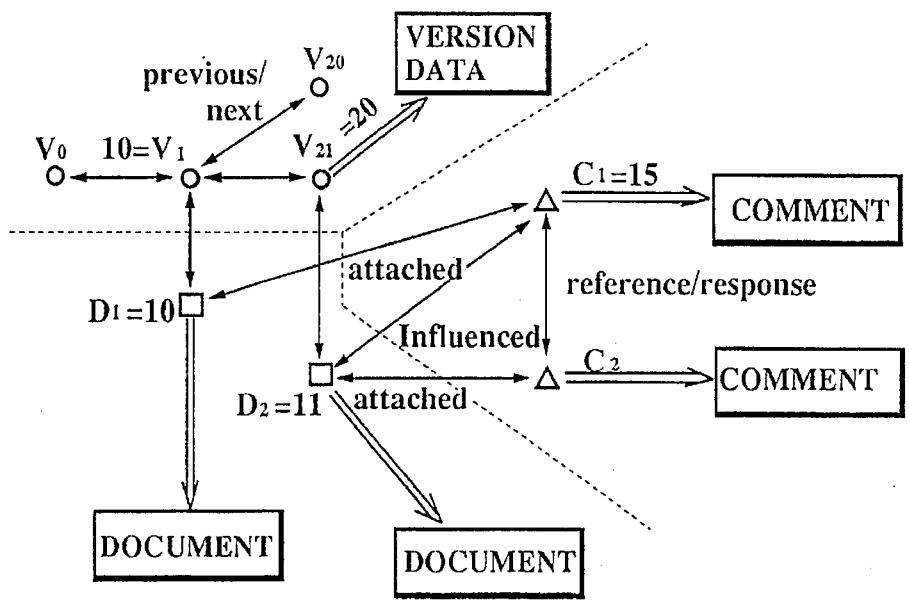
FIG. 9 is a diagram of a data model representation for document data used in the document processing system of FIG. 1.
FIG. 10 is a diagram of a data structure for a "Document" structure unit representing a document node in the data model representation of FIG. 9.

Referring now to FIG. 9, a data model representation of the document data used in this first embodiment of a document processing system will be described.

The data model representation shown in FIG. 9 is a data network model constructed by nodes and links, where there are three types of nodes including a document node represented by a square, a comment node represented by a triangle, and a version data node represented by a circle, while the links among these nodes are indicated by arrows. Here, the links among the nodes are bidirectional links. The document nodes have the identifications (ID) Di according to which they are managed by the document management unit 151 and the document memory unit 41, the comment nodes have the identifications (ID) Ci according to which they are managed by the comment management unit 152 and the comment memory unit 42, and the version data nodes have the identifications (ID) Vi according to which they are managed by the version management unit 153 and the version data memory unit 43. Each version of the document is associated with the corresponding document node and version data node. The document nodes and the comment nodes are connected by the relationships of "attached" and "influenced", while the comment nodes are connected within themselves by the relationships of "reference" and "response", and the version data nodes are also connected within themselves by the relationships of "previous" and "next". The double lined arrows in FIG. 9 indicate the links representing the pointers from the nodes to the actual data.

FIG. 10 shows a data structure for "Document" structure unit representing each document node in the data model representation of FIG. 9. Here, the "Document" structure unit contains fields for ID, size, type, document name, names of creator and modifier, and dates for the creation and modification of the document, as well as for a pointer to the document itself, a list of IDs of the comments attached to the document, a list of IDs of the comments by which the document has been influenced, and a link to the version data of the document.

FIG. 11 shows a data structure for "Comment" structure unit representing each comment node in the data model representation of FIG. 9. Here, the "Comment" structure unit contains fields for ID, size, type, date, and name of commentator of the comment, as well as for a pointer to the comment itself, a list of IDs of the documents to which the comment is attached, and a list of IDs of the documents influenced by the comment.

FIG. 12 shows a data structure for "Version" structure unit representing each version data node in the data model representation of FIG. 9. Here, the "Version" structure unit contains fields for ID, size, type, date, and name of creator of the new version, as well as for IDs of a root version, a latest version, a previous version, and a next version, a link to the document of the present version, a pointer to the supplementary explanation for the modification made in the new version, and a pointer to the modification data for the new version.

FIG. 13 shows a document table to be used in the document database 4 in managing the document data. Here, the document table contains entries for the document name of each document stored in the document database 4, the ID of each document in the root version, and the ID of each document in the latest version.

FIG. 14A shows a document editor table to be used in the editor unit 14 for managing the activated document editors 141, which contains entries for the ID of each document editor 141 and the IDs of the comment editors 142 which have been activated from each document editor 141, as well as a pointer to one of the document editors 141 which has been accessed most recently.

FIG. 14B shows a comment editor table to be used in the editor unit 14 for managing the activated comment editors 142, which contains entries for the ID of each comment editor 142 as well as a pointer to one of the comment editors 142 which is accessed most recently.

By means of the document editor table of FIG. 14A and the comment editor table of FIG. 14B, the editor unit 14 manages a plurality of document editors 141 and a plurality of comment editors 142 along with a plurality of version data display units 143 simultaneously.

In further detail, this first embodiment of a document processing system operates according to the flow charts of FIG. 15 to FIG. 21, as follows.

Figure 15:
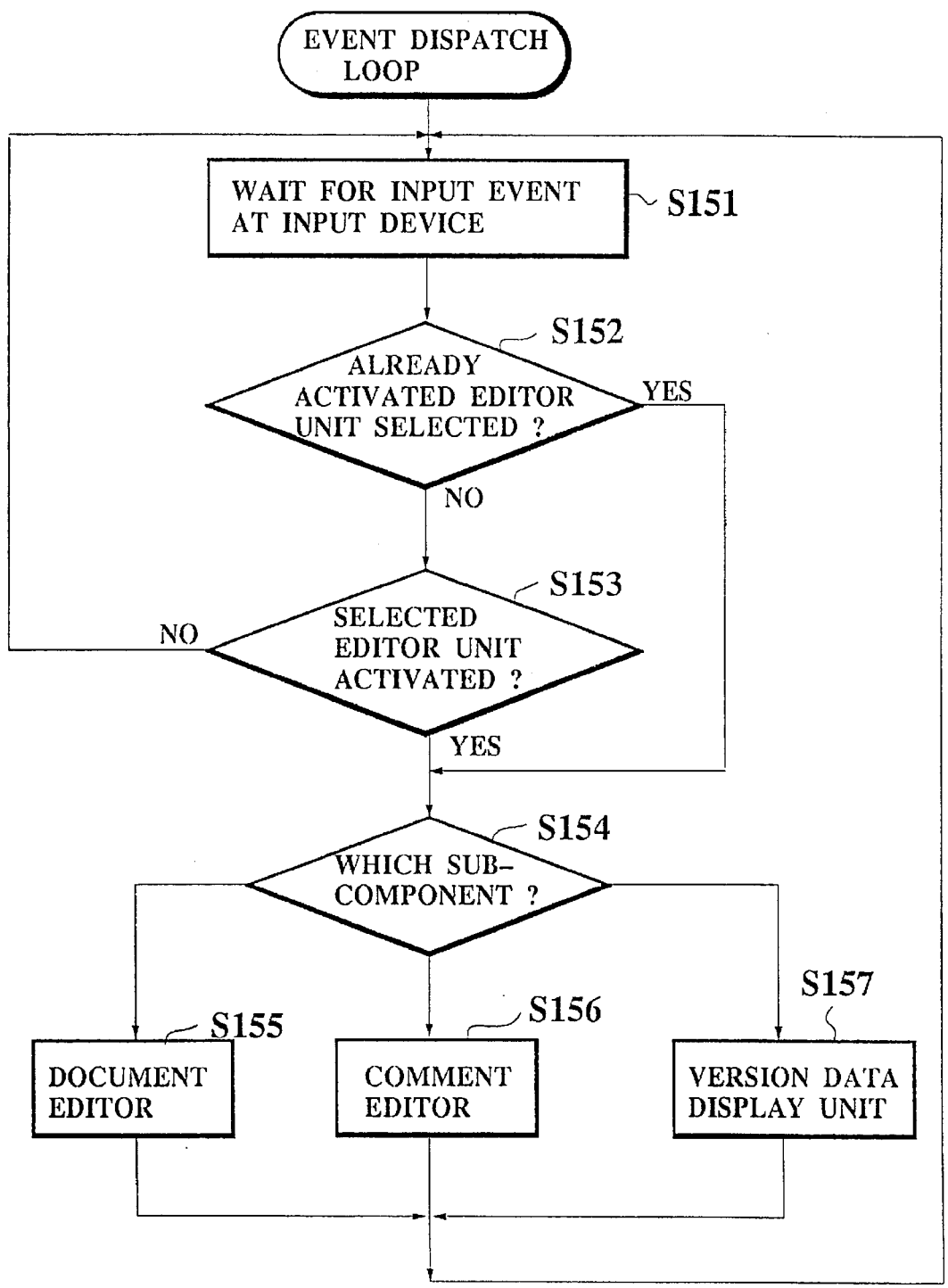
FIG. 15 is a flow chart for an event dispatch loop for making a dispatch of operation to appropriate one of the sub-components of the editor unit in the document processing system of FIG. 1.

FIG. 15 is a flow chart for an event dispatch loop for making a dispatch of the operation to an appropriate one of the sub-components (document editor 141, comment editor 142, version data display unit 143) of the editor unit 14 according to the input event made by the user at the input device 12 which indicates the desired sub-component.

First, at the step S151, the input event at the input device 12 is waited. When there is the input event at the input device 12, next at the step S152, whether the editor unit 14 which has already been activated is selected by the input or not is determined. In a case the editor unit 14 selected by the input has not already been activated, next at the step S153, whether the selected editor unit 14 is activated or not is checked. If the selected editor unit 14 is not activated, the process returns to the step S151.

When the editor unit 14 selected by the input has already been activated at the step S152 or is activated at the step S153, next at the step 154, which one of the sub-components of the editor unit 14 is selected by the input is determined. Then, at the steps S155, S156, and S157, the operation is dispatched to the appropriate one of the sub-components (document editor 141, comment editor 142, version data display unit 143) according to the input event.

Figure 16:
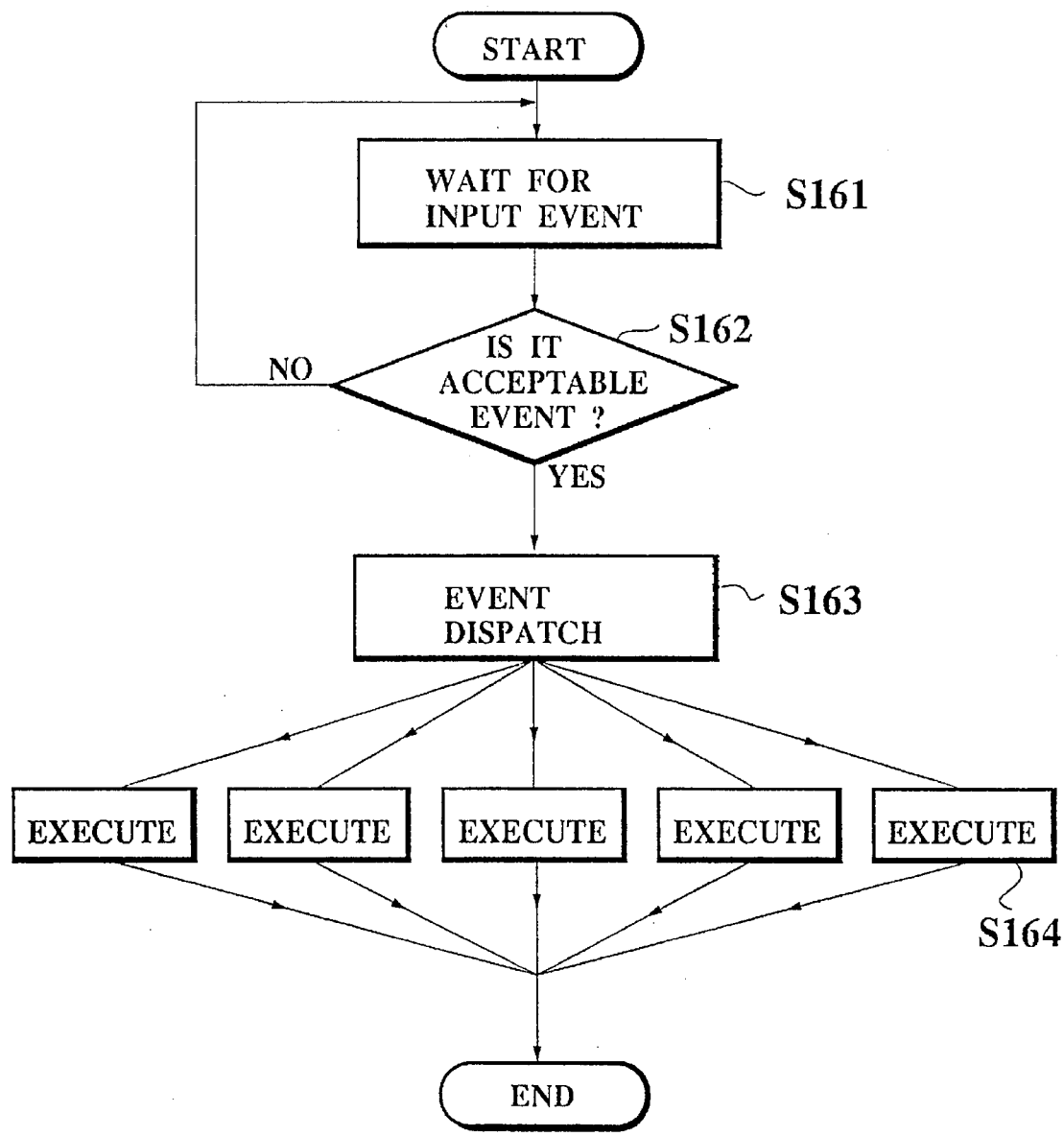
FIG. 16 is a flow chart for an operation common to all of the sub-components of the editor unit in the document processing system of FIG. 1.

Next, FIG. 16 is a flow chart for an operation common to all of the sub-components of the editor unit 14.

First, at the step S161, the input event is waited. When the input event occurred, next at the step S162, whether the input event is acceptable to the selected sub-component or not is determined. If the input event is not acceptable to the selected sub-component, the process returns to the step S161. Otherwise, next at the step S163, the event dispatch is made to the appropriate processing routine at the selected sub-component, and at the step S164, the processing for each event is executed. Here, the processing to be executed includes those for the general operations such as the clicking of the mouse on the icon, the editing operation such as character input, the scroll by using a scroll bar, etc.

Now, for the sake of explanation, the following description of the operation of the document processing system of this first embodiment considers an exemplary case in which a document written by a author is commented by a commentator, and the document is then modified by the author according to the comment given by the commentator, and the modified document is then the checked by a proof-reader.

Figure 17A:
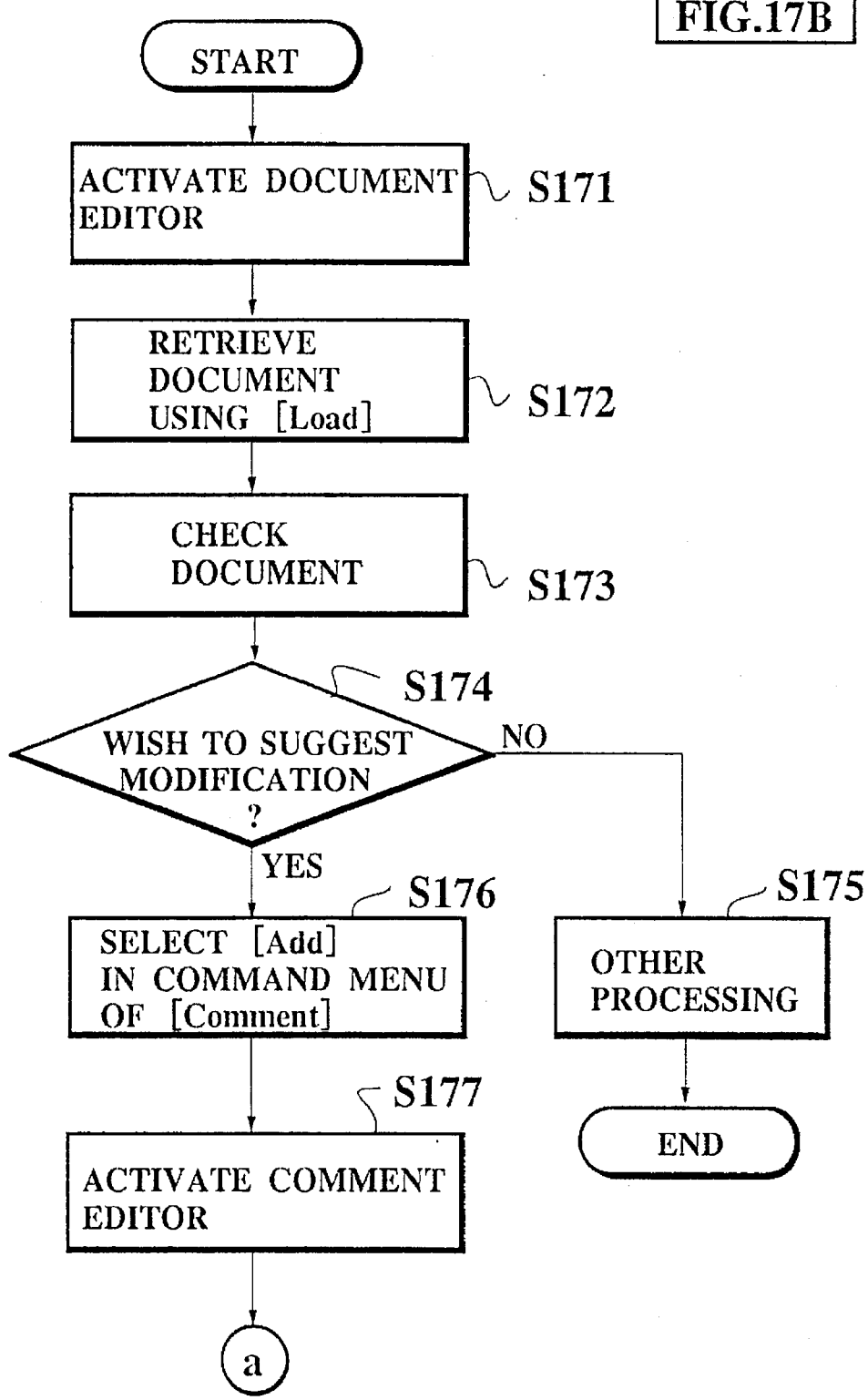
FIG. 17 which consists of FIGS. 17A and 17B is a flow chart of the operation for a case in which the commentator attaches the comment to the document in the document processing system of FIG. 1.
Figure 17B:
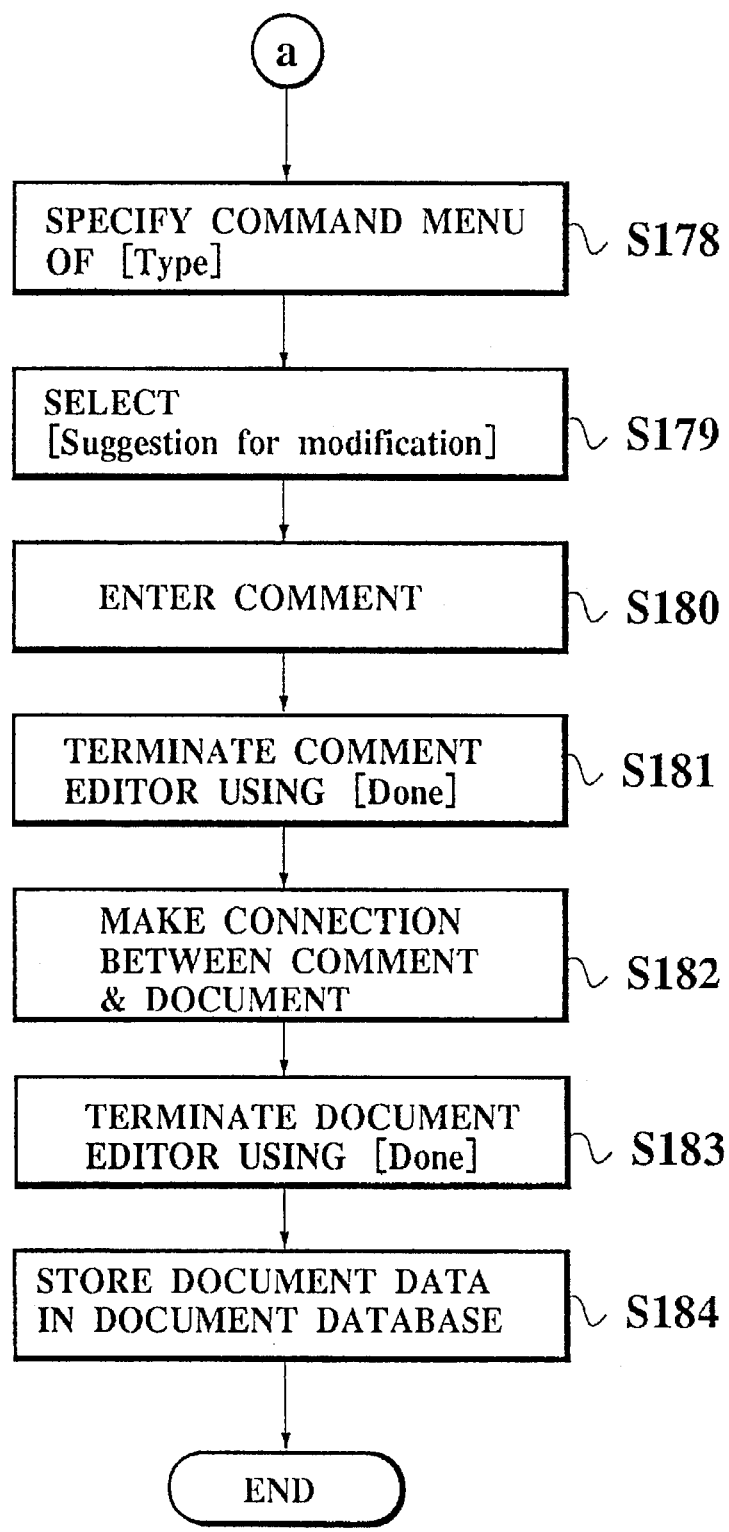

FIG. 17 is a flow chart of the operation for a case in which the commentator attaches the comment to the document.

First, at the step S171, the document editor 141 is activated by using the event dispatch loop of FIG. 15 described above, and then at the step S172, the commentator selects the [Document] icon on the document editor display window shown in FIG. 3 to get the command menu shown in FIG. 4A and selects the [Load] command, so as to retrieve the desired document from the document database 4 and display it on the display device 11, such that the document can be checked by the commentator at the next step S173.

Next, at the step 174, the commentator decides whether he wishes to make any modification or not. In a case he does not wish to make any modification, the process proceeds to the next step S175 for undertaking the other processing.

On the other hand, in a case he does wish to suggest some modifications, next at the step S178, the commentator selects the [Comment] icon on the document editor display window shown in FIG. 3 to get the command menu shown in FIG. 4B and selects the [Add] command, so as to activate the comment editor 142 at the next step S177.

Then, at the step S178, the commentator selects the [Type] icon on the comment editor display window shown in FIG. 5 to get the command menu shown in FIG. 6C, and at the step S179, selects the appropriate type of comment he wishes to make. In this case, the commentator selects the [Suggestion for modification] command at the step S179, as he wishes to suggest the modifications.

Then, the desired comment is entered and edited at the step S180, and the comment editor 142 is terminated by selecting the [Done] icon on the comment editor display window shown in FIG. 5 at the step S181.

In response, at the step S182, the connection between the comment entered at the comment editor 142 and the document on the document editor 141 is automatically made by the system. More specifically, the ID of the entered comment is put into the "attached-comment" field of the "Document" structure unit for this document as shown in FIG. 10, and the ID of the document is put into the "attach-document" field of the "Comment" structure unit for this comment as shown in FIG. 11.

Then, at the step S183, the commentator selects the [Done] icon on the document editor display window shown in FIG. 3 to terminate the document editor 141.

Finally, at the step S184, the document data including the relation between the "Document" structure unit and the "Comment" structure unit established at the step S182 are stored into the document database 4.

Figure 18A:
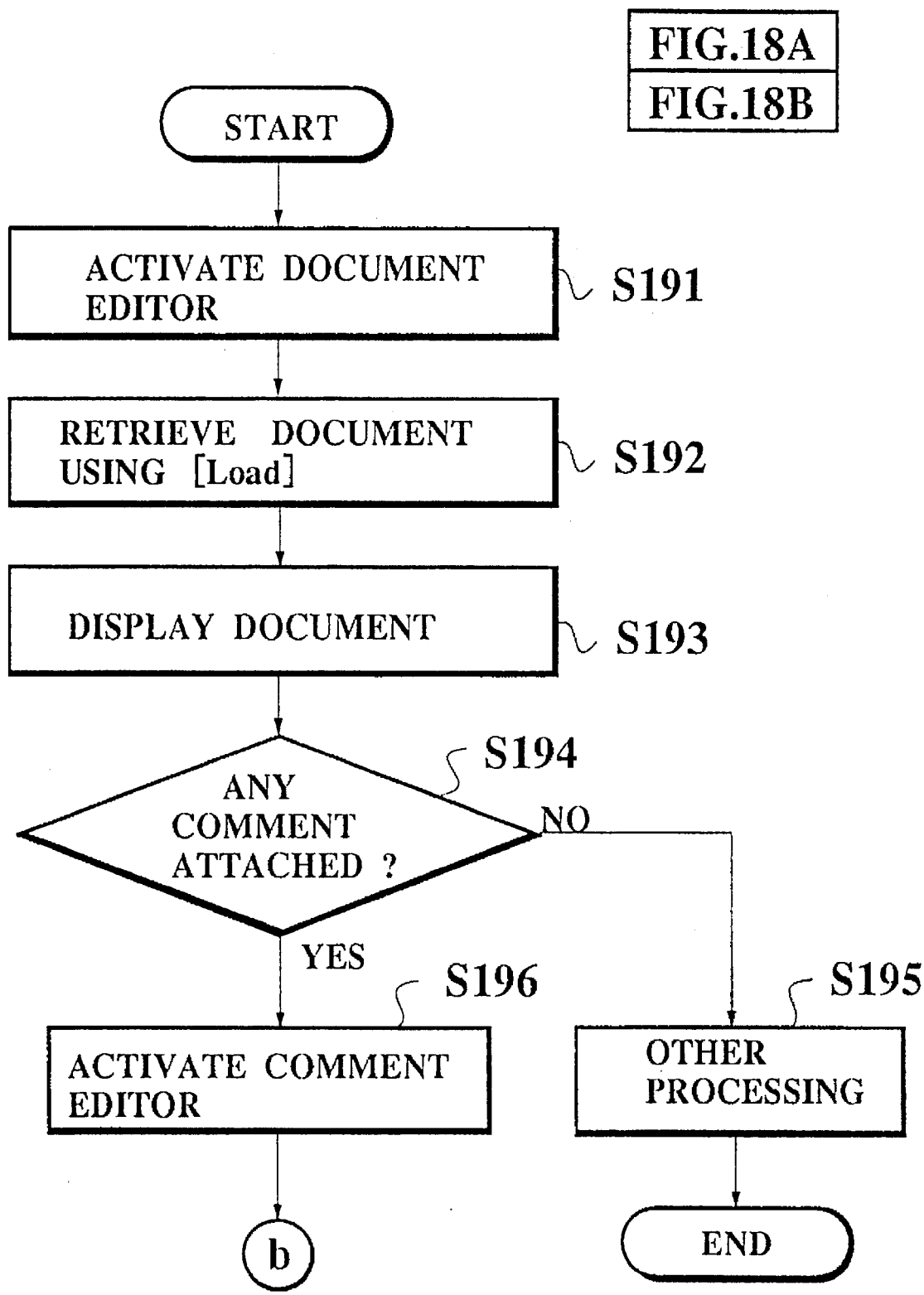
FIG. 18 which consists of FIGS. 18A and 18B is a flow chart of the operation for a case in which the writer modifies the document according to the comment attached by the commentator in the document processing system of FIG. 1.
Figure 18B:
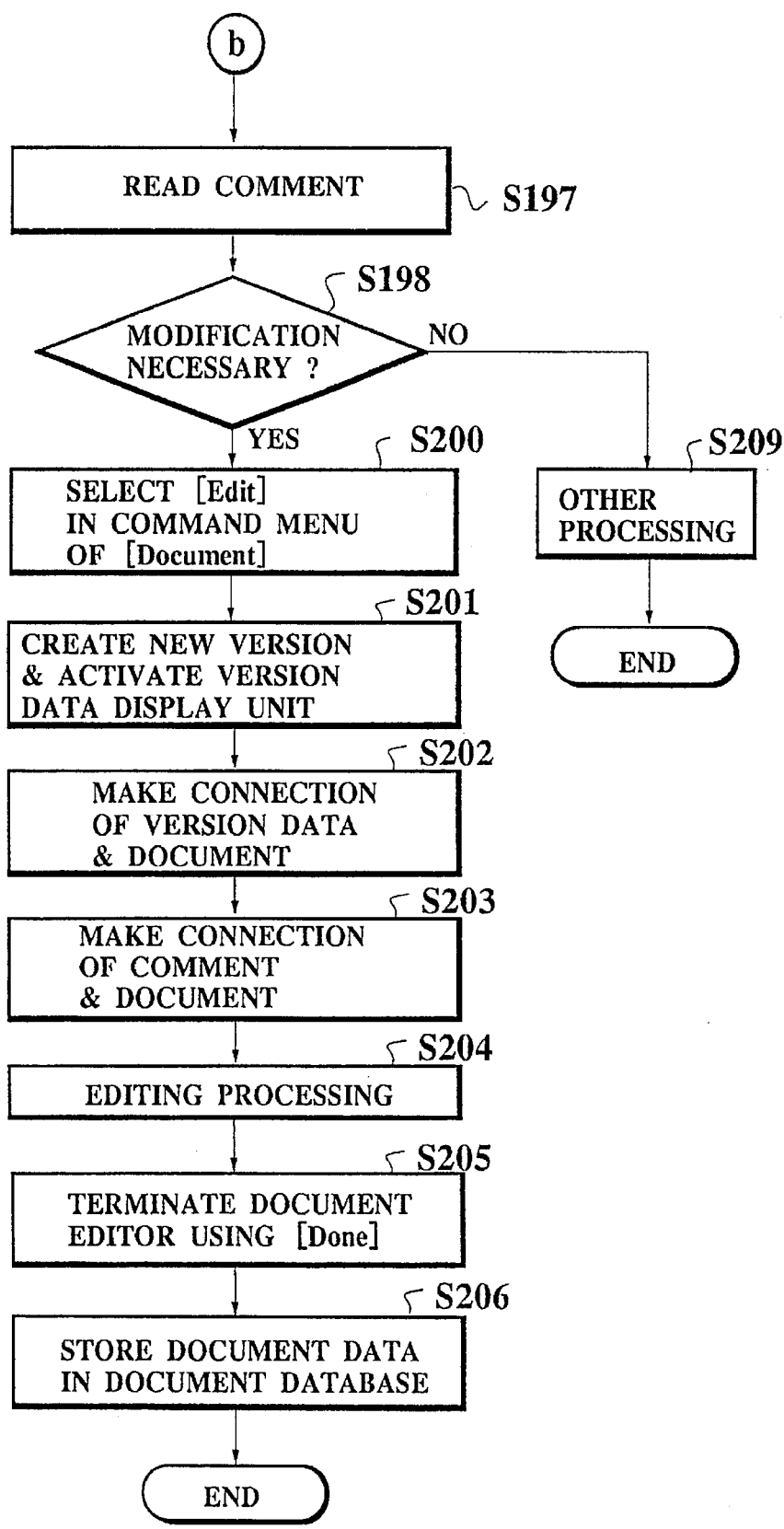

FIG. 18 is a flow chart of the operation for a case in which the original author modifies the document according to the comment attached by the commentator.

First, at the step S191, the document editor 141 is activated by using the event dispatch loop of FIG. 15 described above, and then at the step S192, the author selects the [Document] icon on the document editor display window shown in FIG. 3 to get the command menu shown in FIG. 4A and selects the [Load] command, in order to retrieve the desired document from the document database 4, such that the document is displayed on the display device 11 to the author at the next step S193.

Next, at the step 194, the author determines whether there are any comments attached to the document or not. In a case there is no comment attached to the document, the process proceeds to the next step S195 for undertaking the other processing.

On the other hand, in a case there is a comment attached to the document, next at the step S196, the author selects the [Comment] icon on the document editor display window shown in FIG. 3 to activate the comment editor 142, such that the [Suggestion for modification] attached by the commentator can be read by the author at the step S197.

Next, at the step S198, the author judges whether the suggested modification is necessary or not. In a case the author judges that the modification is unnecessary, the process proceeds to the next step S199 for undertaking the other processing.

On the other hand, in a case the author judges that the modification is necessary, next at the step S200, the author selects the [Document] icon on the document editor display window shown in FIG. 3 to get the command menu shown in FIG. 4A and selects the [Edit] command.

In response, as this document is to be newly modified, the editor unit 14 automatically creates the new version of this document and the version data display unit 143 is activated to display this latest version data for this document at the step S201, and then the connection between the "Version" structure unit for this newly created version data and the "Document" structure unit of this document is automatically made by the system at the step S202. More specifically, in the "Document" structure unit for this document as shown in FIG. 10, the name of the author is put into the "modifier" field, the date is put into the "modify-date" field, the pointer in the "contents" field is adjusted to point to the modified document, and the ID of the newly created version data is put into the "version" field. Meanwhile, in the "Version" structure unit for this version data as shown in FIG. 12, the ID of the initial version of this document is put into the "root-version" field, the ID of this version data itself is put into the "latest-version" field, and the ID of the version of the document before the modification is put into the "previous-version" field.

In addition, next at the step S203, the connection between the "Comment" structure unit for this comment used in making the modification and the "Document" structure unit for this document in the new version incorporating the modification is automatically made by the system. More specifically, the ID of this comment is put into the "influenced-comment" field of the "Document" structure unit for this document as shown in FIG. 10, and the ID of this document is put into the "influence-document" field of the "Comment" structure unit for this comment as shown in FIG. 11.

Then, at the step S204, the desired modification on the document is made by using the document editor 141. Here, the sequence of the editing commands used in modifying the document is written into the "modification" field of the "Version" structure unit for this version data, so as to indicate the content of the modification. In addition, it is also possible to enter the supplementary explanation for the modification into the "explanation" field of the "Version" structure unit for this version data, by using the region VD of the version data display window shown in FIG. 7. Such a supplementary explanation can be quite useful later on because the modification indicated in the "modification" field of the "Version" structure unit may not necessarily be easily comprehensible to the user in general.

Then, after the desired modification is made, next at the step S205, the author selects the [Done] icon on the document editor display window shown in FIG. 3 to terminate the document editor 141.

Finally, at the step S206, the document data including the relation between the "Document" structure unit and the "Version" structure unit established at the step S202 as well as the relation between the "Document" structure unit and the "Comment" structure unit established at the step S203 are stored into the document database 4.

Figure 19:
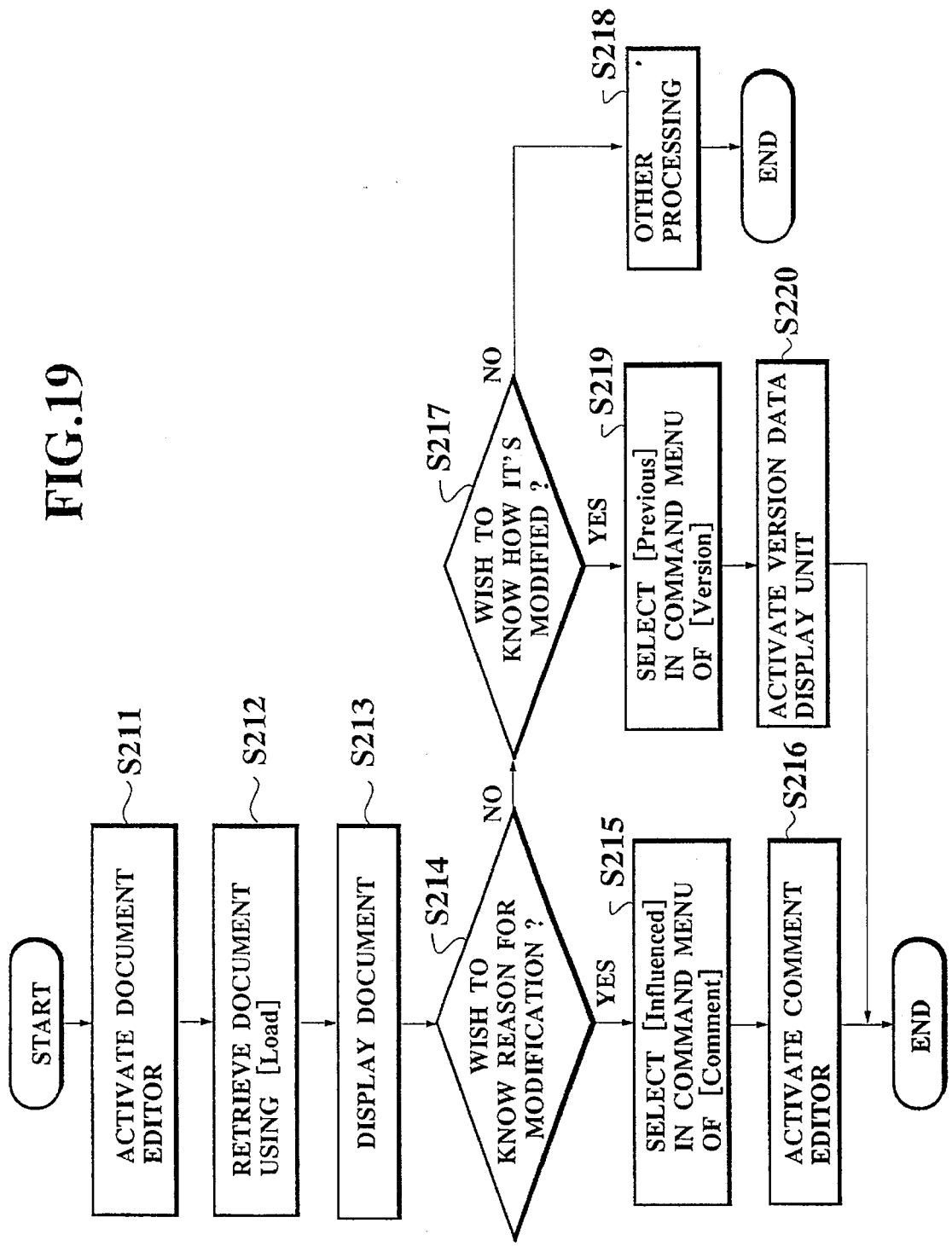
FIG. 19 is a flow chart of the operation for a case in which the proofreader reads the document modified by the writer according to the comment attached by the commentator in the document processing system of FIG. 1.

FIG. 19 is a flow chart of the operation for a case in which the proofreader reads the document modified by the author according to the comment attached by the commentator.

First, at the step S211, the document editor 141 is activated by using the event dispatch loop of FIG. 15 described above, and then at the step S212, the author selects the [Document] icon on the document editor display window shown in FIG. 3 to get the command menu shown in FIG. 4A and selects the [Load] command, so as to retrieve the desired document from the document database 4 and displayed on the display device 11, such that the document can be read by the proofreader at the next step S213. Here, the latest version of the document is displayed on the display device 11 by default.

Next, at the step 214, the proofreader determines whether he wishes to know the reason for the modification in the document. In a case the proofreader does wish to know the reason for the modification in the document, next at the step S215, the proofreader selects the [Comment] icon on the document editor display window shown in FIG. 3 and selects the [Influenced] command. In response, next at the step S216, the comment editor 142 is activated to display the comment put in the "influenced-comment" field of the "Document" structure unit for this document, such that the proofreader can read the [Suggestion for modification] comment attached to this document by the commentator to know the reason for the modification. Here, the proofreader can also read any other comments attached to the document by selecting the [Comment] icon on the comment editor display window shown in FIG. 5 and using the commands in the command menu shown in FIG. 6B.

Also, at the step S217, the proofreader determines whether he wishes to know how the document has been modified. In a case the proofreader does wish to know how the document has been modified, next at the step S219, the proofreader selects the [Version] icon on the document editor display window shown in FIG. 3 and selects the [Previous] command. In response, next at the step S220, the version data display unit 143 is activated to display the version data in the "version" field of the "Document" structure unit for this document, such that the proofreader can read the modification made in the document indicated on the region VE of the version data display window shown in FIG. 7 to know how the document has been modified. Here, the proofreader can also read any other modifications made in the document by selecting the [Version] icon on the version data display window shown in FIG. 7 and using the commands in the command menu shown in FIG. 8B.

In a case the proofreader does not wishes to know either the reason for the modification in the document at the step S214 or how the document has been modified at the step S217, the process proceeds to the next step S218 for undertaking the other processing.

Figure 20:
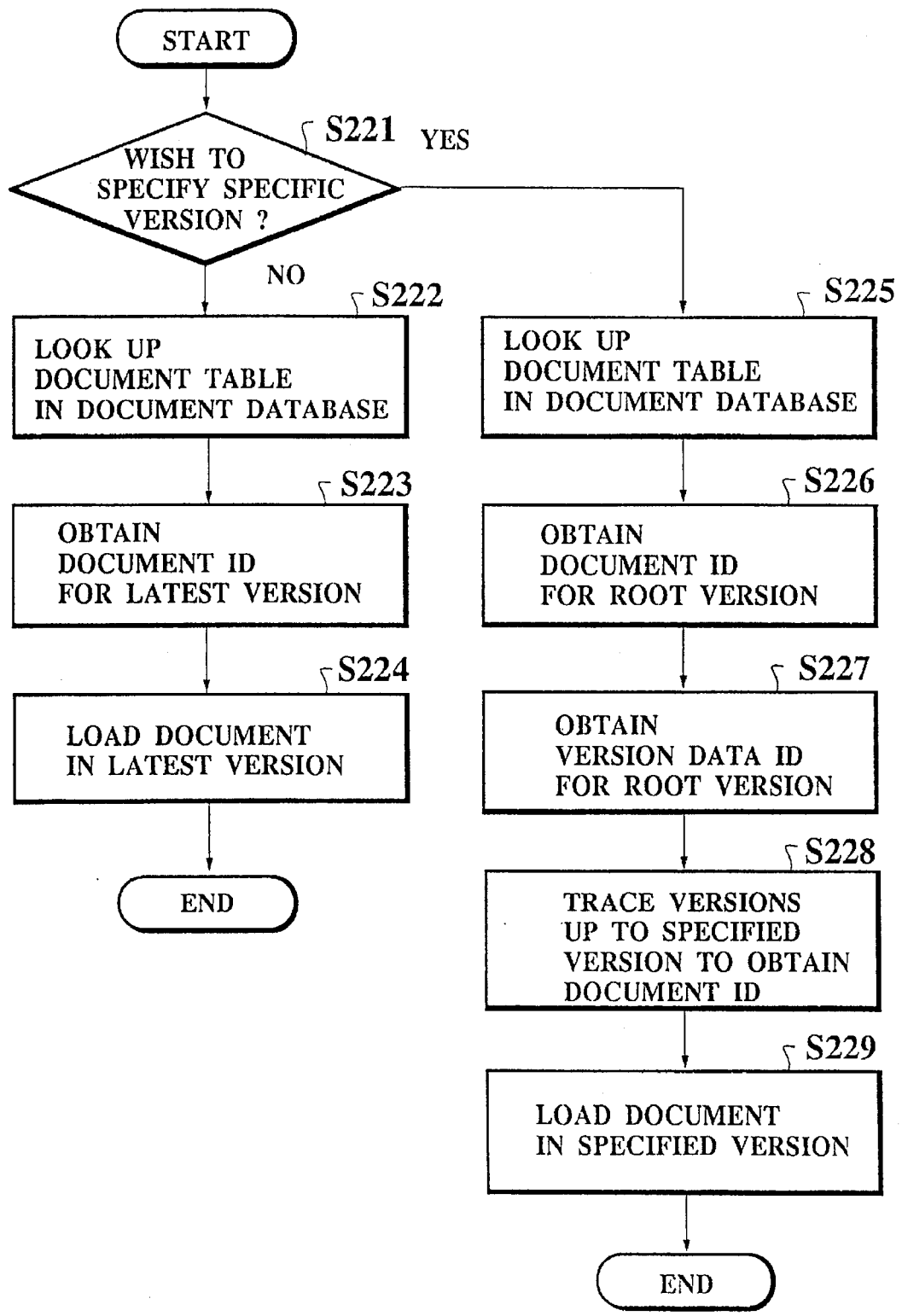
FIG. 20 is a flow chart of the operation for the loading of the document in the document processing system of FIG. 1.

FIG. 20 is a flow chart of the operation for the loading of the document by using the [Load] command, to be carried out at the step S172 in the flow chart of FIG. 17, at the step S192 in the flow chart of FIG. 18, and at the step S212 in the flow chart of FIG. 19 described above.

First, at the step S221, in response to the selection of the [Load] command, whether the user wishes to specify the particular version of the document or not is inquired.

In a case the user does not wish to specify the particular version, next at the step S222, the document table in the document database 4 as shown in FIG. 13 is looked up, and the ID of the document in the latest version is obtained at the step S223. Then, at the step S224, the document in the latest version is loaded according to the ID obtained at the step S223.

On the other hand, in a case the user does specify the particular version at the step S221, next at the step S225, the document table in the document database 4 as shown in FIG. 13 is looked up, and the ID of the document in the root version is obtained at the step S226. Then, at the step S227, the ID of the version data for this document in the root version is obtained from the "Document" structure unit for this document, and then the versions of this document is traced up to the specified version at the step S228 to obtain the ID of the document in the specified version, such that the document in the specified version is loaded at the step S229.

Figure 21A:
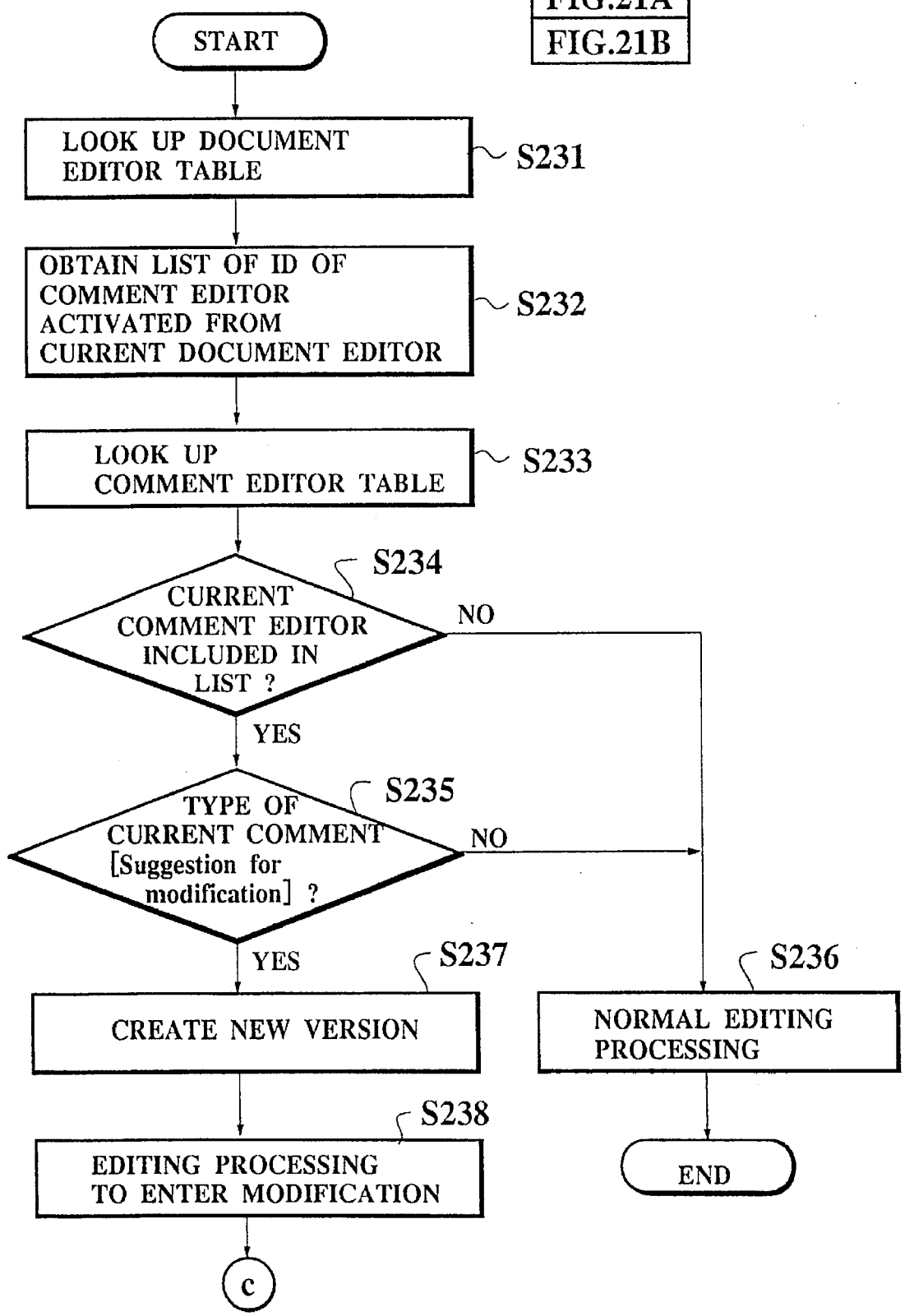
FIGS. 21A and 21B is a flow chart of the operation for the editing of the document in the document processing system of FIG. 1.
Figure 21B:
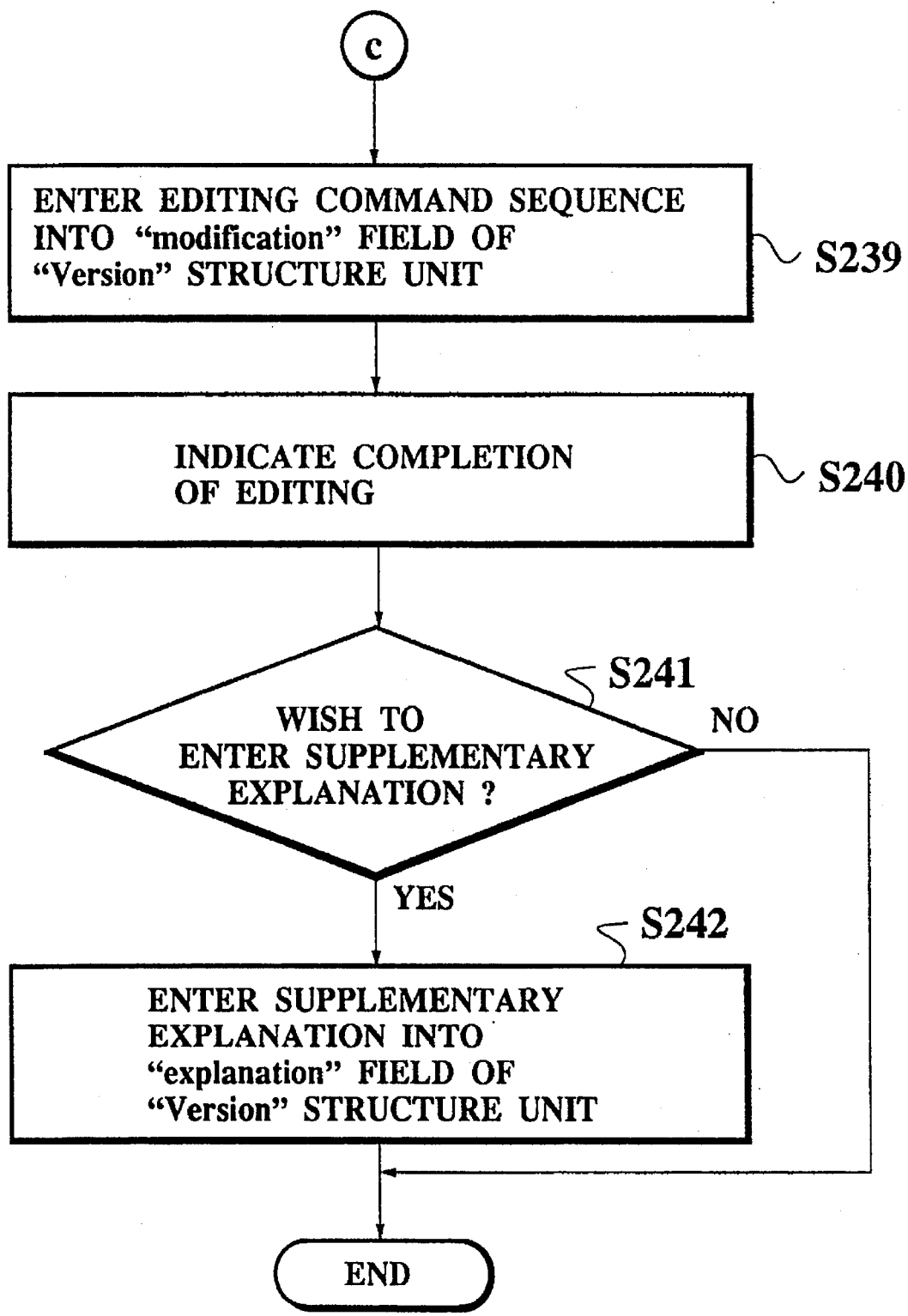

FIGS. 21A, 21B show a flow chart of the operation for the editing of the document by using the [Edit] command, to be carried out at the steps S200, S201, and S204 in the flow chart of FIG. 18.

First, at the step S231, in response to the selection of the [Edit] command, the document editor table in the editor unit 14 as shown in FIG. 14A is looked up, so as to obtain a list of the IDs of the comment editors 142 which has been activated from the currently activated document editor 141 at the step S232. Meanwhile, the comment editor table in the editor unit 14 as shown in FIG. 14B is looked up, so as to obtain the ID of the currently activated comment editor at the step S233.

Then, at the step S234, whether the ID of the currently activated comment editor 142 is included in the list of the IDs obtained at the step S232 is determined, and then at the step S235, whether the type of the comment in the currently activated comment editor 142 is the [Suggestion for modification] or not is determined. In a case either one of the steps S234 and S235 is negative, the process proceeds to the step S236 for undertaking the normal editing processing.

On the other hand, when both of the steps S234 and S235 are affirmative, next at the step S237, the new version of the document in the currently activated document editor 141 is created. More specifically, a new document ID and a new version data ID are obtained, and the pointer in the "contents" field of the newly created "Document" structure unit is pointed to the copy of the document under the editing operation. In addition, the document ID of this document in the new version is put into the "latest-version document ID" field in the document table shown in FIG. 13.

Then, after the connection between the "Version" structure unit and the "Document" structure unit is automatically made by the system at the step S202 and the connection between the "Comment" structure unit and the "Document" structure unit is automatically made by the system at the step S203 in the flow chart of FIG. 18, as described above, next at the step S238, the normal editing processing for making the desired modification on the document is carried out by using the document editor 141. Here, as described above in conjunction with the step S204 in the flow chart of FIG. 18, the sequence of the editing commands used in modifying the document is written into the "modification" field of the "Version" structure unit for the new version data at the step S239, so as to indicate the content of the modification.

Then, when the user indicates the completion of the editing at the step S240, next at the step S241, whether the user wishes to enter the supplementary explanation for the modification or not is inquired. In a case the user wishes to do so, next at the step S242, the supplementary explanation for the modification is entered into the "explanation" field of the "Version" structure unit for this version data, by using the region VD of the version data display window shown in FIG. 7. Otherwise, the process terminates after the step S241.

As described, according to this document processing system of the first embodiment, the sufficient communication among the collaborating authors can be realized by means of the document data including the comments and the version data which are accessible simultaneously by any one of the collaborating authors, such that the collaborative document processing work can be realized more smoothly and efficiently. In particular, it becomes possible in this document processing system to eliminate the futile and wasteful repetition of the same argument among the different members of the collaborating authors.

It is to be noted that, in the first embodiment described above, all of the older versions of each document are kept in the document database 4 whenever a new version is created, but this may be modified such that only the root version of the document is kept in its entirety and the remaining versions are memorized in terms of the differences with respect to the respective previous versions alone, so as to reduce the memory capacity required. Alternatively, only the latest version of the document may be kept in its entirety while all the other versions are memorized in terms of the differences with respect to the respective next versions alone, for the similar effect.

Figure 22:
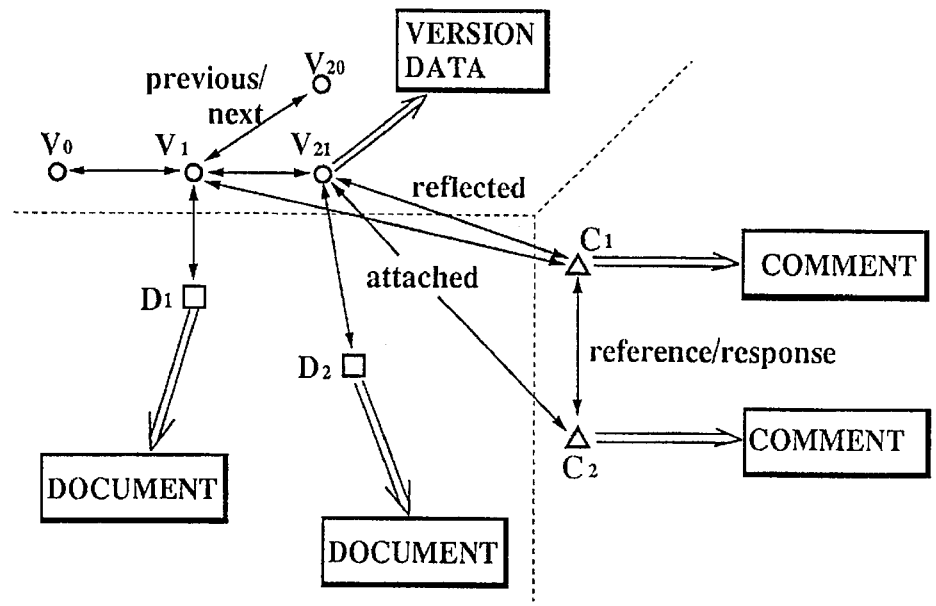
FIG. 22 is a diagram of another data model representation for document data that can be used in the document processing system of FIG. 1.

It is also to be noted that the data model representation of FIG. 9 used in the first embodiment described above may be replaced by another data model representation such as that shown in FIG. 22, in which the links between the document nodes and the comment nodes in FIG. 9 are replaced by the links between the version data nodes and the comment nodes.

It is also to be noted that the specific data structures used in the above description of the first embodiment may be replaced by other data structures, according to the requirement imposed in view of the execution speed, memory capacity, or other conditions.

It is also to be noted that the document nodes and the comment nodes may include the data in a form other than the text form used in the above description of the first embodiment, such as speech data, figure data, table data, picture data, video data, graphic data, etc.

It is also to be noted that, instead of sharing the document database 4 among a plurality of personal terminal devices as in the first embodiment described above, a plurality of document databases may be provided with respect to a plurality personal terminal devices.

Now, the second embodiment of a document processing system according to the present invention will be described in detail.

In this second embodiment, each document is considered as a structure in which its divided parts are connected by structural relationships, and each document as well as its divided parts are represented as instances in a class which generalizes them. In other words, there is a hierarchical structure in which each document is comprised of a number of chapters, each chapter is comprised of a number of sections, and each section is comprised of a number of sub-sections, such that the specific chapter such as the first chapter is conceived as an instance of the class "chapter", for example.

Similarly, the users or the groups of users of this document processing system are considered as instances of a class which generalizes the users.

Some of the classes can also be considered collectively as a sub-class of a super-class which generalizes the classes.

Now, in this second embodiment, various execution conditions on the processings to be executed in the document processing system are specified in advance, for each class of users, groups of users, documents, and parts of the documents, such that the processing is executed only when these execution conditions are verified. Here, the execution conditions to be specified includes the following.

(a) The users or the groups of users who can execute the processings, or their attribute data.

(b) The contents of the processings, such as editing, deleting, printing, displaying, copying, etc.

(c) The time to execute the processings.

(d) The attributes of the data to be processed by the processings, such as date of creation, creator, size, type of data format, etc.

(e) Combinations of any number of (a) to (d).

By means of these execution conditions, the delicate control of the processings in the document processing system can be achieved. For example, in a situation in which it has only been possible to give the permission to read a document conventionally, it becomes possible to set the condition such as that in which the display is permitted but the printing is prohibited. In addition, as an example of a combination of (e) enlisted above, the unnecessary errors can be prevented, for example, by setting the permission for the printing according to the data format and the size of the processing target in advance.

These execution conditions can be set up in either one or both of the following forms.

(i) The acceptance conditions for permitting the execution of the processings.

(ii) The rejection conditions for refusing the execution of the processings.

In a case of using both of these forms, it is not necessary for the condition given in one form to be a complete complement of the corresponding condition given in another form.

In addition, the following may also be added to the execution conditions enumerated above.

(f) The agreement by a plurality of users or groups of users involved.

For example, the condition containing the group decision making by a plurality of users such as "The target document can be submitted to the Journal publication if two of the involved users agree with it." and "The target document cannot be submitted to the journal publication if three of the involved users disagree with it." can be set up, and the permission or rejection of the proposed processing is determined according to the one of the two conditions described above which is satisfied earlier.

Furthermore, the following may also be added to the execution conditions enumerated above.

(g) After and/or before the execution of a specific processing by a specific person, a message of a specific content is to be notified to that specific person.

Figure 23:
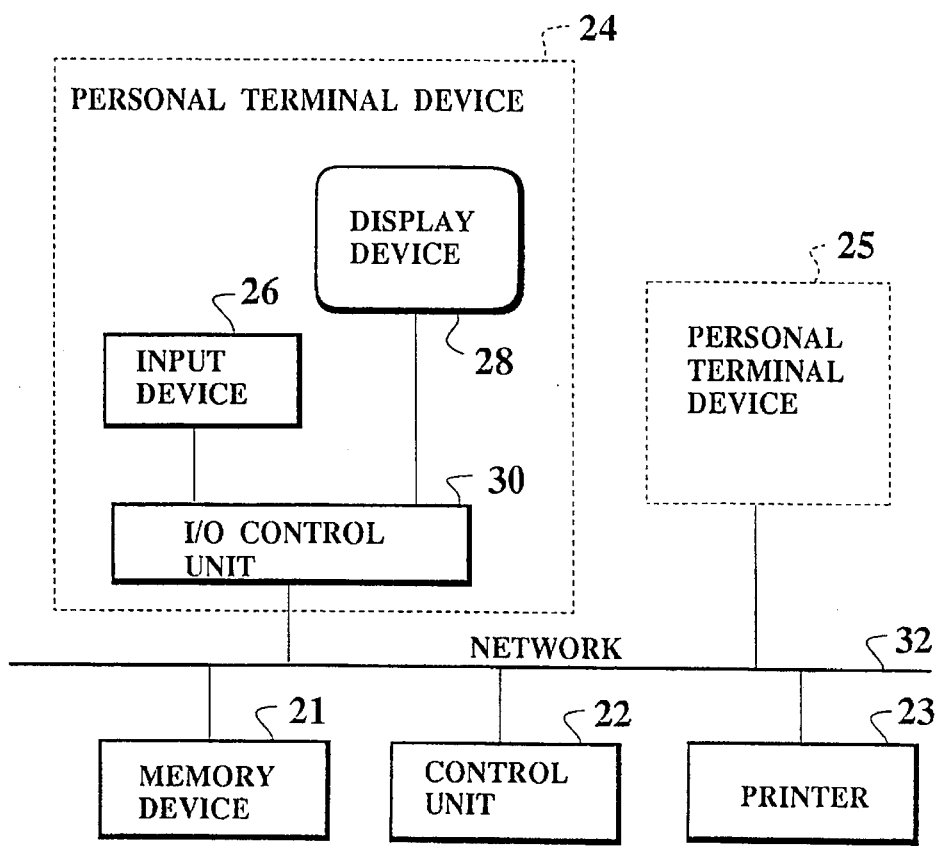
FIG. 23 is a block diagram of a second embodiment of a document processing system according to the present invention.
Figure 24:
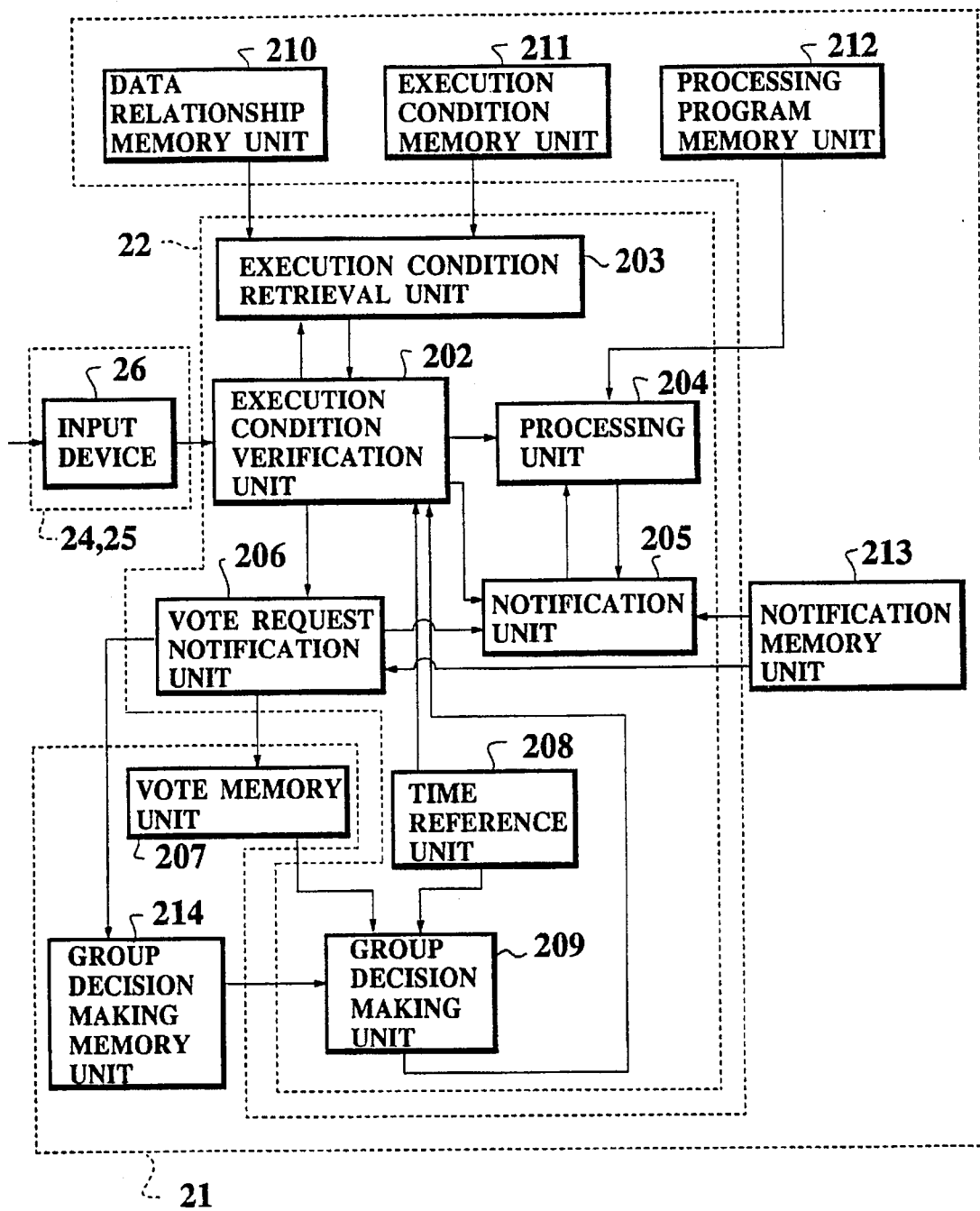
FIG. 24 is a detailed block diagram of a memory device and a control unit in the document processing system of FIG. 23.

Referring now to FIG. 23 and FIG. 24, a configuration of the document processing system of this second embodiment will be described in detail.

FIG. 23 shows a schematic configuration of the document processing system of this second embodiment, which comprises: a plurality (two in FIG. 28) of personal terminal devices 24 and 25, each of which is assigned to each one of collaborating users; a memory device 21; a control unit 22; and a printer 23; all of which are connected through a network 32. Here, the personal terminal devices 24 and 25 have the identical internal configuration, so that the internal configuration of only the personal terminal device 24 is shown in FIG. 23 and will be described in detail below.

The personal terminal device 24 further comprises: an input device 28 including a keyboard and a mouse for inputting the commands and input data from the user; a display device 28 for displaying output of the system to the user; and an input and output (I/O) control unit 30 for controlling the input from the input device 26 and the output to the display device 28.

The memory device 21 memorizes various data and programs to be used in the system, while the control unit 22 controls the operations of the personal terminal devices 24 and 25, the memory unit 21, and the printer 23, as will be described in detail below.

In this second embodiment, the memory device 21 and the control unit 22 have detailed configurations as shown in FIG. 24.

Namely, the memory device 21 further comprises: a data relationship memory unit 210 for memorizing data on the classes of the users of the system and the documents to be processed in the system, as well as the hierarchical structure of their structural relationships; an execution condition memory unit 211 for memorizing the execution conditions on each of the data memorized in the data relationship memory unit 210; a processing program memory unit 212 for memorizing programs for executing various processings; a notification memory unit 213 for memorizing a program and data for a notification to be made according to the execution condition of the type (g) enumerated above; a group decision making memory unit 214 for memorizing a program and data related to a group decision making by the agreement of a plurality of users according to the execution condition of the type (f) enumerated above; and a vote memory unit 207 for memorizing votes from a plurality of users participating in the group decision making according to the execution condition of the type (f) enumerated above.

The control unit 22 further comprises: an execution condition verification unit 202 for verifying the specified execution conditions prior to the execution of the processings; an execution condition retrieval unit 203 for providing the execution conditions to be used at the execution condition verification unit 202 according to the data stored in the data relationship memory unit 210 and the execution condition memory unit 211; and a processing unit 204 for executing the processings according to the programs stored in the processing program memory unit 212, only when the execution conditions are verified at the execution condition verification unit 202.

Thus, whenever there is an input from the input device 26 of the personal terminal device 24 and 25, the execution condition verification unit 202 obtains the relevant execution conditions from the execution condition memory unit 211 through the execution condition retrieval unit 203, according to: a user requesting an execution of the processing; a content of the processing requested to be executed; a time requested for executing the processing; and data to be used in the requested processing, and then judges whether the specified execution conditions are satisfied or not. When the specified execution conditions are judged to be satisfied by the execution condition verification unit 202, the requested processing is executed at the processing unit 204, whereas otherwise the request for the execution of the processing made by the user is rejected.

In a case the necessary data are not stored in the data relationship memory unit 210 or the execution conditions are not specified in the execution condition memory unit 211 for the target data of the requested processing, the execution condition retrieval unit 203 makes up for the necessary data or the execution conditions by inheriting the default settings of the data or the execution conditions of the class or the super-class to which the target data belong, according to the relationships stored in the data relationship memory unit 210.

Similarly, in a case the necessary data are not stored in the data relationship memory unit 210 or the execution conditions are not specified in the execution condition memory unit 211 for the target document part of the requested document processing condition, the execution condition retrieval unit 203 makes up for the necessary data or the execution conditions by using the corresponding data or execution conditions of the hierarchically superior structural part of the document which the target document part constitutes, or by inheriting the data or the execution conditions of the document which the target document part constitutes, according to the relationships stored in the data relationship memory 210. For example, when the target document part is the sub-section, the data or the execution conditions of the section or the chapter which contains that target sub-section will be used.

In addition, in order to deal with the execution condition of a type (g) enumerated above, the control unit 22 further comprises a notification unit 205 for making a notification of the execution of the processing whenever the processing is executed at the processing unit 204 by using the data stored in the notification memory unit 213, according to the specified execution condition of a type (g). Here, the notification can be made in a form of any one of the conventional known notification method such as the electronic mail or the TALK.

Furthermore, in order to deal with the processing condition of a type (f) enumerated above, the control unit 22 further comprises: a vote request notification unit 206 for requesting votes from the users participating in the group decision making; a time reference unit 208 for providing a prescribed valid voting time period for the votes from the users participating in the group decision making; and a group decision making unit 209 for making the group decision according to the valid votes casted by the users participating in the group decision making, by using the prescribed rule such as a decision by majority, according to the specified execution condition of a type (f).

Thus, when there is a request for the group decision making, the data such as the name of the user who requested the group decision making, the target of the group decision making, a time at which the request for the group decision making is made, and an order in which the requests for the group decision makings are made are memorized in the group decision making memory unit 214, while the vote request notification unit 206 issues the notification for requesting the vote to the users participating in the group decision making, through the notification unit 205. Here, the display unit 28 of each personal terminal device is controlled to display the content of the group decision to be made, a method of group decision making, a time of the group decision making, an order of the group decision makings, and an intermediate result of voting, in response to the command from each user. The votes casted in response to this vote request notification are memorized in the vote memory unit 207. Then, the group decision making unit 209 makes the group decision by checking the votes stored in the vote memory unit 207 within a valid time period specified by the time reference unit 208, and reports the result of the group decision to the execution condition verification unit 202. If the notification of the result of the group decision to the participants is specified in the execution condition, the execution condition verification unit 202 issues such a notification to each of the participants through the notification unit 205.

Referring now to FIGS. 25 to 30, the examples of data used in this second embodiment of a document processing system will be described.

FIG. 25 is an example of data for a user stored in the memory device 21. This example of FIG. 25 shows the data for a user called "Taro Tanaka", who is a member of the second section and the safety committee. This data of FIG. 25 also specifies the execution condition for permitting the execution of the edit processing on this data to be such that the user must be the chief of the second section. Thus, when the user enters the command to edit this data from the personal terminal device, the control unit 22 refers to this execution condition, and checks if the user is the chief of the second section, so as to permit the execution of the edit processing only when the user is indeed the chief of the second section.

FIG. 26 is an example of data for a user group stored in the memory unit 21. This example of FIG. 26 shows the data for a user group called "second section", whose chief is Hiroshi Suzuki who belongs to the programming department, and whose members includes Hiroshi Suzuki, Taro Tanaka, Kenji Yamaguchi, etc. This data of FIG. 26 also specifies the execution condition for permitting the execution of the edit processing condition on this data to be such that the user must be the chief of the programming department.

FIG. 27 is an example of data for a document stored in the memory unit 21. This example of FIG. 27 shows the data for a document in a type of "Manual" called the "J3900 Manual", whose authors are Taro Tanaka, Kenji Yamaguchi, and Toshio Watanabe, and which has the chapters including Introduction, Summary of J3900, Window system, etc. This data of FIG. 27 also specifies the execution condition for permitting the reading of this data to be such that the user must be the member of the second section, and the execution condition for permitting the deletion of this data to be the agreement by the majority of the members of the second section.

FIG. 28 is an example of data for a document part stored in the memory unit 21. This example of FIG. 28 shows the data for a document part called "Window System", which is one of the chapters of the document called "J3900 Manual", whose author is Taro Tanaka, and which has the sections including Window Server, Window Manager, etc.

FIG. 29 is an example of data for a class of document parts stored in the memory unit 21. This example of FIG. 29 shows the data for a class called "Chapter". This data of FIG. 29 also specifies the default setting of the execution condition for the edit processing to be such that the user is one of its authors. Such a default setting will be utilized in a case the execution condition for the edit processing is not specified for the data for the sub-classes or the instances of this class, as described above.

FIG. 30 is an example of data for a proposition of a processing stored in the memory unit 21. This example of FIG. 30 shows the data for a proposition for the deletion of the document called "J3900 Manual" which is proposed by Taro Tanaka on 15:32 of May 12, 1991, using the vote request message of "Shall we delete it as it is no longer necessary?". Such a data is automatically produced at the vote request notification unit 208 in the control unit 22 when the command for making the proposition is received from the user, by automatically recording the name of the user who made the proposition and the data at which the proposition is made.

In addition, the vote request notification unit 206 notifies the content of the proposition, the target data, and the vote request message to the other users who should be participating in this group decision making. In this case, Taro Tanaka who made the proposition himself is presumed to be agreeing to this proposition, so that the agreement by Taro Tanaka is automatically recorded by the vote memory unit 207. In addition to the agreement and the disagreement, the vote may also be made in forms of abstention and delegation. The subsequent votes from the participants of the group decision making, such as a vote for disagreement casted by Kenji Yamaguchi on 15:45 of May 12, 1991 shown in FIG. 30, are also recorded by the vote memory unit 207. Then, the group decision making unit 209 automatically determines the acceptance or the rejection of this proposition by using the prescribed rule, which is the decision by majority as specified in the data shown in FIG. 27 in this case, by checking the votes recorded in the vote memory unit 207.

Figure 32:
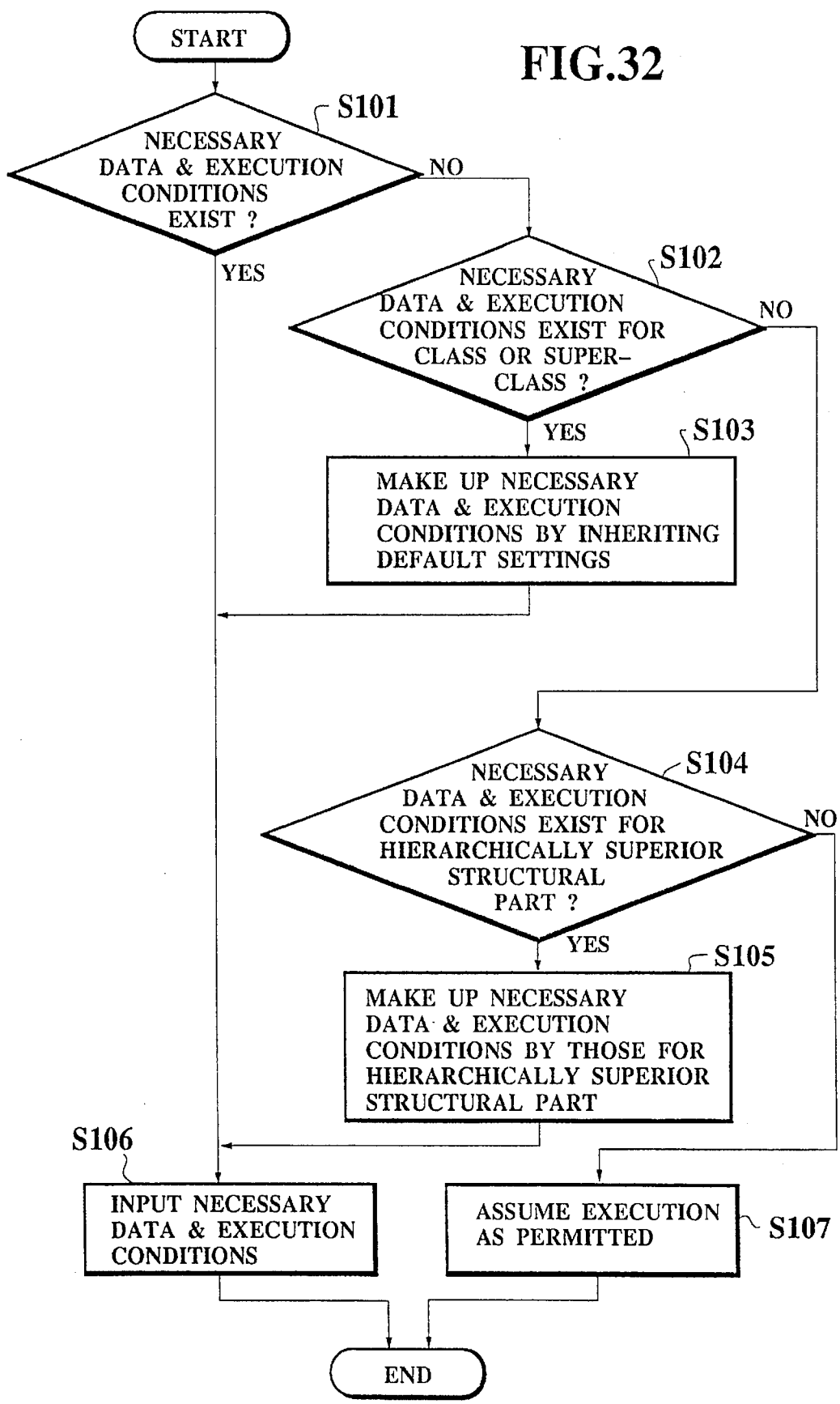
FIG. 32 is a detailed flow chart for a step of retrieval of the execution conditions in the flow chart for the overall operation of FIG. 31.
Figure 33A:
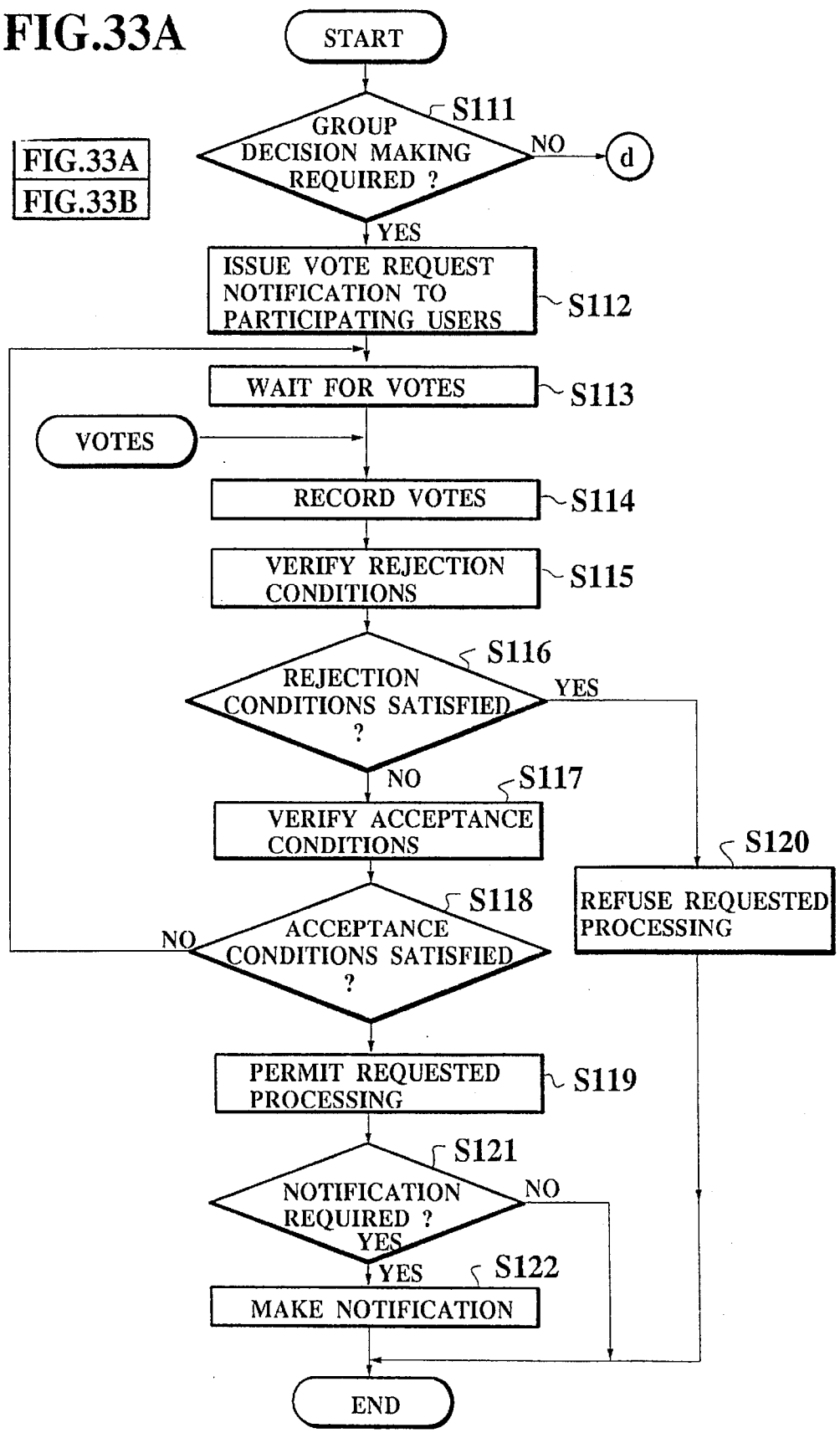
FIG. 33 which consists of FIGS. 33A and 33B is a detailed flow chart for a step of verification of the execution conditions in the flow chart for the overall operation of FIG. 31.
Figure 33B:
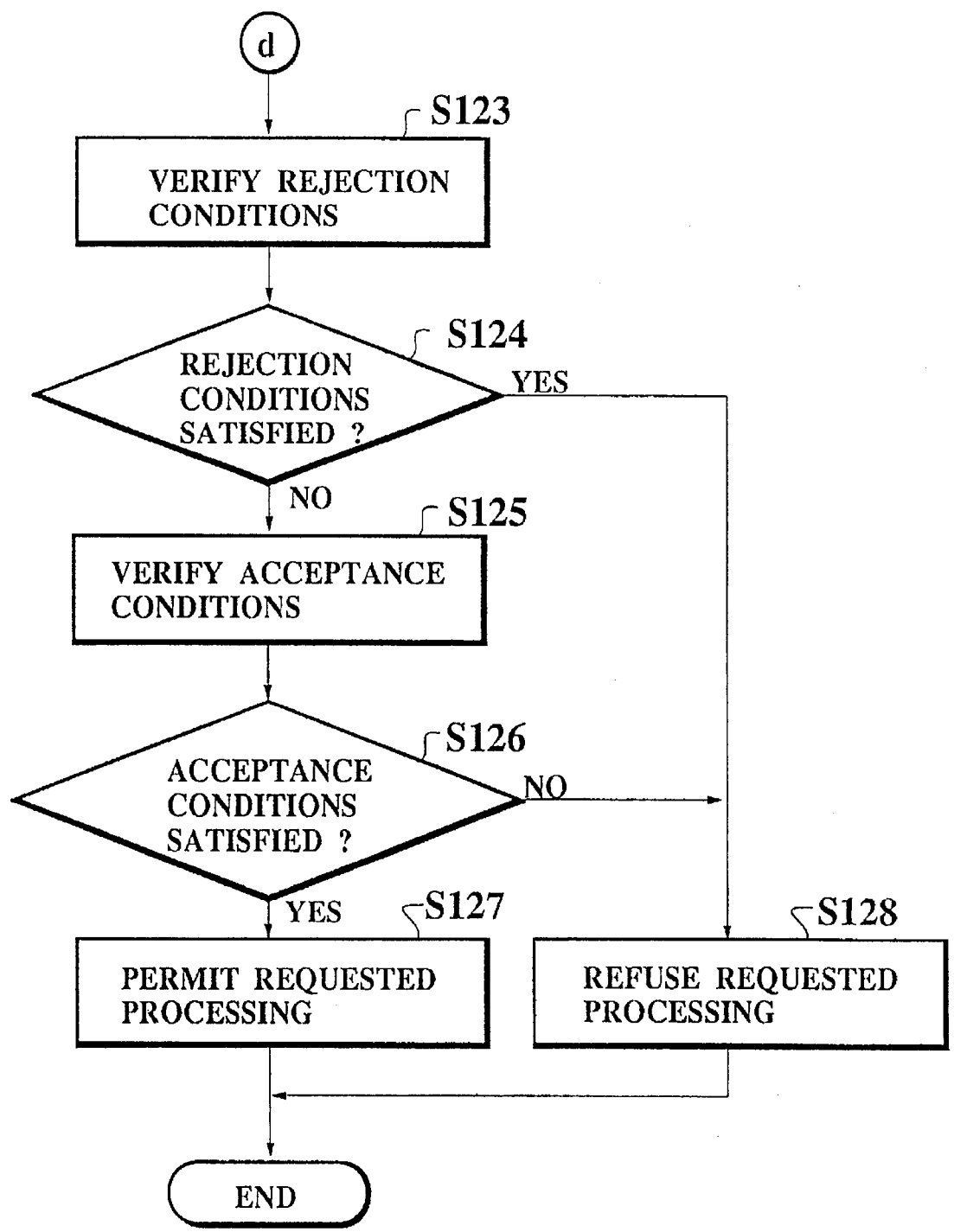

Referring now to the flow charts shown in FIGS. 31 to 33, the operation of this second embodiment of a document processing system will be described in detail.

Figure 31:
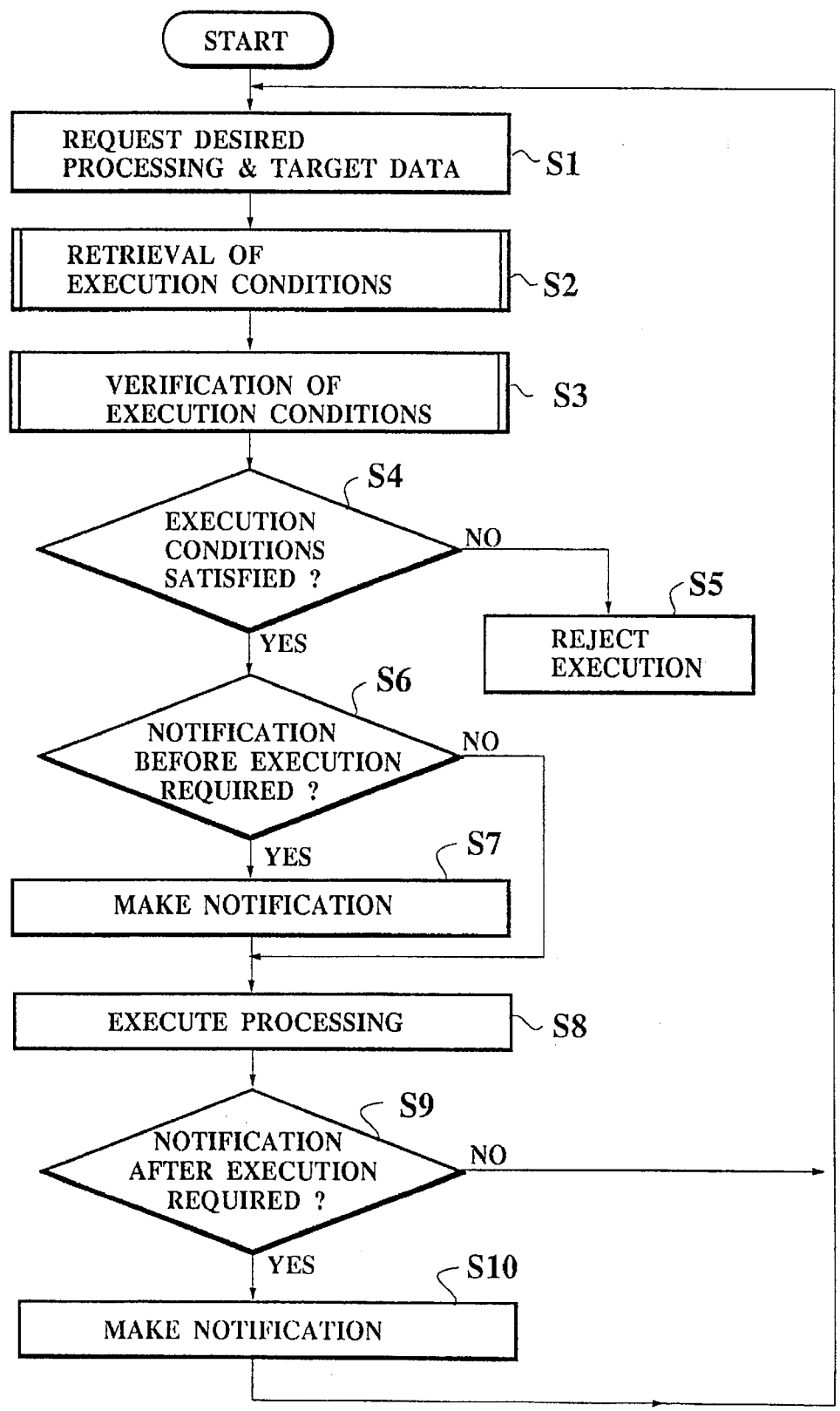
FIG. 31 is a flow chart for an overall operation of the document processing system of FIG. 23.

FIG. 31 is a flow chart for the overall operation of this second embodiment of a document processing system.

First, at the step S1, the desired processing and its target data are requested by the user from the personal terminal device.

Then, at the step S2, the execution conditions on this user and the target data of the requested processing are inputted by the execution condition retrieval unit 203. This input of the execution conditions by the execution condition retrieval unit 203 is carried out according to the flow chart of FIG. 32 to be described in detail below.

Then, at the step S3, the execution conditions on this user and the target data of the requested processing inputted by the execution condition retrieval unit 203 are verified by the execution condition verification unit 202. This verification of the execution conditions at the execution condition verification unit 202 is carried out according to the flow chart of FIG. 33 to be described in detail below.

As a result of the verification of the execution conditions at the execution condition verification unit 202, in a case the execution conditions are judged to be not satisfied, the execution of the requested processing is rejected at the next step S5.

Otherwise, next at the step S6, whether there is an execution condition of a type (g) demanding the notification before the execution of the requested processing is also specified or not is determined. In a case there is such an execution condition of a type (g) specified, the notification is made by the notification unit 205 at the next step S7.

Then, at the step S8, the execution of the requested processing is carried out by the processing unit 204.

Next at the step S9, whether there is an execution condition of a type (g) demanding the notification after the execution of the requested processing is also specified or not is determined. In a case there is such an execution condition of a type (g) specified, the notification is made by the notification unit 205 at the next step S10, before the process return to the step S1 for the next processing.

The input of the execution conditions by the execution condition retrieval unit 203 at the step S2 is carried out according to the flow chart of FIG. 32, as follows.

First, at the step S101, whether the necessary data are stored in the data relationship memory unit 210 and the execution conditions are specified in the execution condition memory unit 211 for the target data of the requested processing or not is determined. In the case of the affirmative, next at the step S106, the execution condition retrieval unit 203 inputs these necessary data stored in the data relationship memory unit 210 and the execution conditions specified in the execution condition memory unit 211 for the target data of the requested processing into the execution condition verification unit 202.

On the other hand, in the case of the negative, next at the step S102, whether the corresponding data and the execution conditions are specified for the class or the super-class to which the target data belong or not is determined. In the case of the affirmative, next at the step S103, the execution condition retrieval unit 203 makes up for the necessary data or the execution conditions by inheriting the default settings of the data or the execution conditions of the class or the super-class to which the target data belong, according to the relationships stored in the data relationship memory unit 210. Then, next at the step S106, the execution condition retrieval unit 203 inputs these necessary data and the execution conditions into the execution condition verification unit 202.

Otherwise, when the target data is the document part, next at the step S104, whether the corresponding necessary data and the execution conditions are specified for the hierarchically superior structural part of the document which the target document part constitutes or not is determined. Here, the search of the necessary data and the execution conditions for the hierarchically superior structural part at the step S104 can be carried out in any desired order until such necessary data and the execution conditions are found.

In the case of the affirmative, next at the step S105, the execution condition retrieval unit 208 makes up for the necessary data or the execution conditions by using the data or the execution conditions of the hierarchically superior structural part of the document which the target document part constitutes, according to the relationships stored in the data relationship memory 210. For example, when the target data is a sub-section, the hierarchically superior structural part of the document includes section, chapter, or document itself, which contains the sub-section of the target data as one of its parts. Then, next at the step S106, the execution condition retrieval unit 203 inputs these necessary data and the execution conditions into the execution condition verification unit 202.

Otherwise, in a case it has failed to find the corresponding necessary data and the execution conditions at the steps S102 to S105, next at the step S107, this fact is notified from the execution condition retrieval unit 203 to the execution condition verification unit 202, in which case the execution condition verification unit 202 assumes that the execution of the requested processing is permitted.

The verification of the execution conditions at the execution condition verification unit 202 is carried out according to the flow chart of FIG. 33, as follows.

First, at the step S111, whether the execution conditions include the execution condition of a type (f) requiring the group decision making based on the agreement of the users or not is determined.

In a case the execution condition of a type (f) is included, next at the step S112, the data such as the name of the user who requested the group decision making, the target of the group decision making, a time at which the request for the group decision making is made, and an order in which the requests for the group decision makings have been made are memorized in the group decision making memory unit 214, while the vote request notification unit 206 issues the notification for requesting the vote to the users participating in the group decision making, through the notification unit 205, such that the display unit 28 of each personal terminal device displays the content of the group decision to be made, a method of group decision making, a time of the group decision making, an order of the group decision makings, and an intermediate result of voting, in response to the command from each user.

Then, at the step S113, the votes from the users participating in the group decision making are waited for a predetermined valid voting time period specified by the time reference unit 208.

The votes casted in response to this vote request notification are memorized in the vote memory unit 207 at the step S114.

Then, the group decision making unit 209 makes the group decision according to the votes stored in the vote memory unit 207 within the valid time period. This is achieved by first checking the execution conditions given in forms of the rejection conditions at the step S115. When the rejection conditions are found to be satisfied at the next S116, the execution of the requested processing is refused at the step S120.

Otherwise, the execution conditions given in forms of the acceptance conditions are checked at the step S117 next. When the acceptance conditions are found to be satisfied at the next S118, the execution of the requested processing is permitted at the step S119. Then, next at the step S121, whether the notification of the result of the group decision to the participants is specified in the execution condition of not is determined, and in a case such a notification is specified, the execution condition verification unit 202 issues such a notification to each of the participants through the notification unit 205 at the step S122.

On the other hand, when the acceptance conditions are found to be not satisfied at the step S118, the process returns to the step S113.

In a case the execution conditions are found to be not including the execution condition of a type (f) at the step S111, next at the step S128, the execution conditions given in forms of the rejection conditions are checked first. When the rejection conditions are found to be satisfied at the next S124, the execution of the requested processing is refused at the step S128.

Otherwise, the execution conditions given in forms of the acceptance conditions are checked at the step S125 next. When the acceptance conditions are found to be satisfied at the next S126, the execution of the requested processing is permitted at the step S127. On the other hand, when the acceptance conditions are found to be not satisfied at the step S126, the execution of the requested processing is refused at the step S128.

It is to be noted here that, instead of using a valid voting time period specified by the time reference unit 208, the group decision making by the group decision making unit 209 may be made every time a new vote is casted, until it becomes possible to make the determination.

It is also to be noted that the acceptance conditions may be checked before checking the rejection conditions, or both of the acceptance conditions and the rejection conditions may be checked in parallel. In the latter case, it is possible to come up with a contradictory result such as the simultaneous determinations of the acceptance and the rejection, so that it becomes necessary to notify the users participating in the group decision making when such a contradictory result is obtained.

According to this second embodiment of a document processing system as described above, the following advantageous effects can be obtained.

(1) In a case of producing a document by a plurality of collaborating authors, the different part of the document can be assigned to each author, and the execution conditions can be set in advance such that the editing of each document part can be made by the assigned author and other specified persons alone, while the reading of any document part can be made by any one of the collaborating authors, such that any one of the collaborating author can see the entire document at any time in order to coordinate his part with the rest of the document. As a result, there will be no need for a tedious work to collect all the document parts from a plurality of collaborating authors together in order to make the coordination of the document as a whole. Consequently, the wasteful work can be eliminated from the collaborative document processing work, and the need to make a large number of wasteful copies of the document parts can be eliminated.

(2) In a case in which a plurality of proofreaders are going to check the document, the execution conditions can be set in advance such that the proofreaders can also read the document, while enabling each proofreader to attach the comment to the document on the system as in the first embodiment described above, so that there will be no need to distribute the document among these proofreaders by making a large number of copies of the document. In addition, each proofreader can attach the comment without making a copy of the document. In addition, the execution conditions can be set such that the comments attached to the document can be read by those who are involved in the document production only, so that there will be no need to distribute the comments among those who are involved in the document production by making a large number of copies of the comments. Furthermore, the execution conditions can be set such that those who are permitted to read the comments can be notified whenever the comment is attached, such that the attachment of the comments can be recognized immediately. Moreover, the execution conditions can be set to prohibit the printing of the comments, such that only the document itself can be printed out without disclosing the contents of the comments.

(3) In a case of disclosing a part of the document to the persons other than the assigned author, the execution conditions can be set in advance such that only that part of the document can be read by the other persons. As a result, there will be no need to make a large number of copies of that part of the document.

(4) In a case the document is managed electronically, a specific electronic operation on the document can be permitted to only a limited number of persons under the specific conditions, by using the appropriate execution conditions, without providing a specially programmed software program.

(5) In a case of executing a processing which affects a plurality of authors, such as a modification of a part of the document under the collaborative document processing work, it is possible to notify the execution of such a processing to the other authors who can be affected, by using the execution conditions concerning the notification, without a failure. As a result, it becomes possible for each of the collaborating authors to know the progress of the collaborative work as a whole, such that the efficiency of the work can be improved.

(6) It is possible to make a group decision concerning the document produced in collaboration among a plurality of involved persons according to a predetermined procedure such as the decision by majority, as the system collects the votes from the involved persons and determines the group decision, automatically. As a result, such a group decision making can be made more efficiently and unambiguously.

It is to be noted that the setting of the appropriate execution conditions in advance is crucially important in this document processing system, so that the operation for the setting should be allowed to only a limited number of system managers, for the purpose of the safety. Accordingly, the users at the personal terminal device should be allowed to set the execution conditions for the instances produced by himself alone, such that usually they can only use the execution conditions inherited from the execution conditions for the class set by the system managers.

It is also to be noted that, although the node-link model for representing the hierarchical structure in the document has been used in the above description, the execution conditions similar to those described above can also be utilized effectively for processings of documents with flat structure, in order to achieve the delicate document file management. In such a case, however, the execution condition retrieval unit 203 and the data relationship memory unit 210 will be unnecessary.

It is also to be noted that the data to be processed in the document processing system may includes the data in a form other than the document using text data used in the above description of the second embodiment, such as speech data, figure data, table data, picture data, video data, graphics data, etc.

Figure 34:
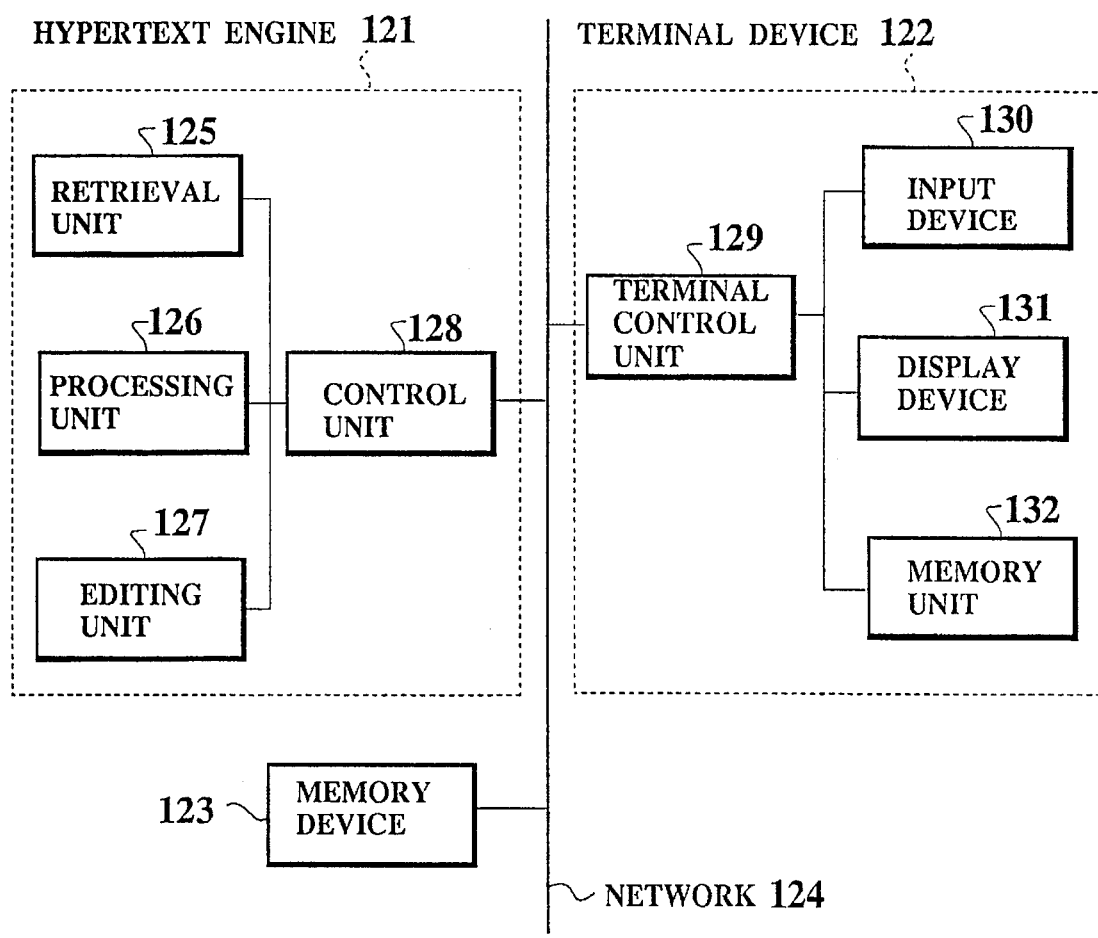
FIG. 34 is a block diagram of a third embodiment of a document processing system according to the present invention.

Referring now to FIG. 34, the third embodiment of a document processing system according to the present invention, which is in a form of a hypertext system, will be described in detail.

In this third embodiment, the document processing system comprises: a hypertext engine 121 for controlling the operations of the system; a terminal device 122 to be operated by a user of the system; a memory device 123 for memorizing data units such as document to be processed in the system and relation units expressing the relationships among the data units; and a network 124 for interconnecting the hypertext engine 121, the terminal device 122, and the memory device 123. Although only one terminal device 122 is shown in FIG. 34, a plurality of similar terminal devices to be used by a plurality of users may be connected to the network 124.

The hypertext engine 121 further comprises: a retrieval unit 125 for retrieving the data units and relation units stored from the memory device 123; a processing unit 126 for executing the processings on the data units to be processed; an editing unit 127 for editing the data units to be processed while maintaining the consistency among the data units used in the system; and a control unit 128 for controlling the processings to be executed on the data units to be processed.

The terminal device 122 further comprises: a terminal control unit 129 for controlling input and output of data in the terminal device 122; an input device 130 including a keyboard and a mouse for inputting commands from the user; a display device 131 for displaying the output of the system to the user; and an internal memory unit 132 for temporarily memorizing the data units and a state of the system.

In this third embodiment, the data units are defined as follows.

Namely, each data unit is defined in terms of a number of attributes having specific attribute values, including an ID for uniquely specifying each data unit. The data unit used in this third embodiment is equivalent to the object used in the object language or the structure unit used in the C language.

The relationships among the data units and a part or a whole of the attribute data of each data unit are expressed by units called relation units. Each relation unit has the attributes such as reference source and reference target for specifying the relationships.

Figure 35A:
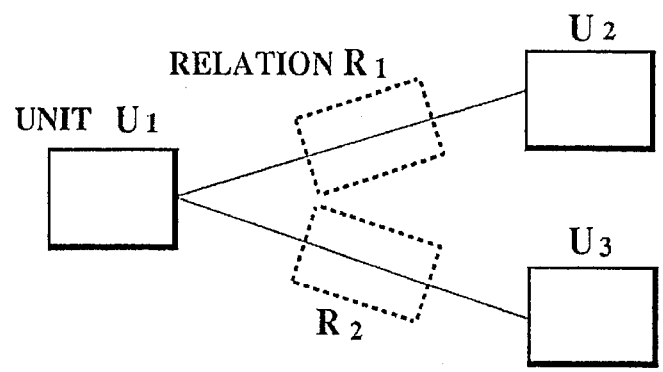
FIGS. 35A, 35B, and 35C are diagrams of various relationships among data to be used in the document processing system of FIG. 34.
Figure 35B:
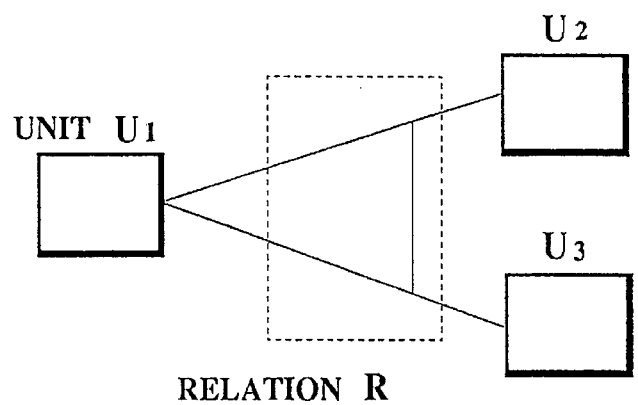

Here, the relationships to be expressed by the relation units not only includes the two-term relationship such as the parent-child relationship among a parent unit U1 and child units U2 and U3 which are separately related to the parent unit U1 through relations R1 and R2, respectively, as shown in FIG. 35A, but also includes the multi-term relationship among the data units U1, U2, and U3 which are mutually related with each other through a relation R, as shown in FIG. 35B. In order to express such a multi-term relationship among the data units, the relation unit uses the attributes such as names of the data units, names of the attributes, and positions and ranges within the attribute data. In a case the object of the multi-term relationship is the entire data unit, the attributes such as names of the attributes, and positions and ranges within the attribute data can be omitted. Also, in a case the object of the multi-term relationship is a particular attribute of the data unit, the positions and ranges within the attribute data can be omitted.

Figure 35C:
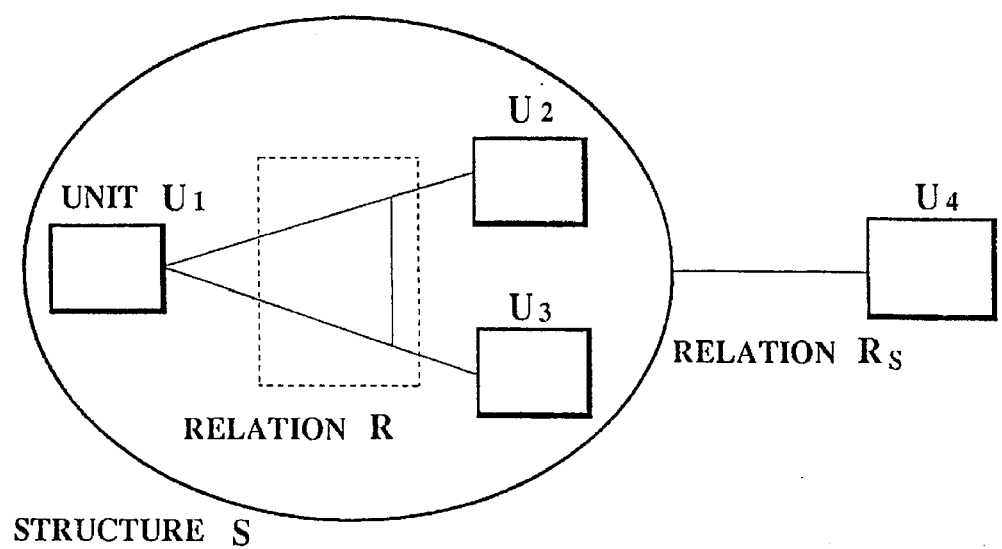

In addition, this third embodiment also uses the relation units for expressing the meta-level relationships among the structures themselves as well as between the structures and the data units, where each structure is constructed by links of the relation units representing the multi-term relationships among the data units, as shown in FIG. 35C. In order to distinguish such a meta-level relationships involving the structures from the relationships among the data units, the designation "Structure" is used in the attribute values of the relation unit expressing such a meta-level relationship involving the structures, as will be described below.

Each data unit also contains the attribute "Relations" whose attribute values are a list of a names of the relation units which express the multi-term relationships for that data unit or a part or a whole the attributes of that data unit. Each data unit also contains the attribute "Method" whose attribute values are the contents and conditions of the processings to be executed on a part or a whole of that data unit.

Now, the examples of the data units and the relation units used in this third embodiment of a document processing system will be described in detail.

FIG. 36A shows an example of a data unit having the text data describing a mushroom called "Takamiyuratake". This data unit has the ID "U011001" as its unique name. Also, the attribute "Relations" contains the attribute values indicating a list of a names (IDs) of the relation units which express the multi-term relationships for that data unit or a part or a whole the attributes of that data unit, such as "R110001", "R110002", "R110003", etc.

Similarly, FIG. 36B shows an example of a data unit having the text data describing a mushroom called "Takamidokutake". This data unit has the ID "U011002" as its unique name. Also, the attribute "Relations" contains the attribute values indicating a list of a names (IDs) of the relation units which express the multi-term relationships for that data unit or a part or a whole the attributes of that data unit, such as "R110001", "R110002", "R110003", etc.

FIG. 36C shows an example of a data unit having the text data describing "A manner of distinguishing Takamiyuratake and Takamidokutake". This data unit has the ID "U012001" as its unique name.

FIG. 37A shows an example of a relation unit having the ID of "R110001" for representing a reference relationship between the reference source "U011001 Text Data 10.14" and the reference target "U011002". This reference relationship represented by the relation unit of FIG. 37A indicates that the reference is made from 14 letters from the 10th word in the attribute "Text Data" of the data unit "U011001" (i.e., the data unit "Takamiyuratake" shown in FIG. 36A), which are the letter series "Takamidokutake", to the data unit "U011002" (i.e., the data unit "Takamidokutake" shown in FIG. 36B).

Similarly, FIG. 37B shows an example of a relation unit having the ID of "R110002" for representing a reference relationship between the reference source "U011002 Text Data 10.14" and the reference target "U011001". This reference relationship represented by the relation unit of FIG. 37B indicates that the reference is made from 14 letters from the 19th letter in the attribute "Text Data" of the data unit "U011002" (i.e., the data unit "Takamidokutake" shown in FIG. 36B), which are the letter series "Takamiyuratake", to the data unit "U011001" (i.e., the data unit "Takamidokutake" shown in FIG. 36A).

FIG. 37C shows an example of a relation unit having the ID of "R110003" for representing the three-term relationship among the data units shown in FIGS. 36A, 36B, and 36C. Namely, this relation unit of FIG. 37C represents the comparison relationship formed by the comparison target "U011001 Text Data 10.7" and "U011002 Text Data 9.7", and the comparison content "U012001". In other words, this comparison relationship represented by the relation unit of FIG. 37C indicates that the comparison implied by 7 letters from the 10th word in the attribute "Text Data" of the data unit "U011001" (i.e., the data unit "Takamiyuratake" shown in FIG. 36A), which are the letter series "similar" and 7 letters from the 9th letter in the attribute "Text Data" of the data unit "U011002" (i.e., the data unit "Takamidokutake" shown in FIG. 36B), which are the letter series "similar" is made in the data unit "U012001" (i.e., the data unit "A manner of distinguishing Takamiyuratake and Takamidokutake" shown in FIG. 36C).

Referring now to the flow chart of FIG. 38, the operation of the display of the data units in this third embodiment of a document processing system will be described in detail.

First, at the step S301, the command for displaying the data unit U1: "Takamiyuratake" is given by the user at the input device 130, and in response, next at the step S302, the terminal device 129 sends this command to the hypertext engine 121 through the network 124.

Then, the control unit 128 of the hypertext engine 121 receives this command at the step S303, and in response, activates the retrieval unit 125 at the step S304, so as to retrieve the data unit U1: "Takamiyuratake" from the memory device 123.

Next, at the step S305, the relation units $R_i$ (i=1, 2, ..., n) enlisted as the attribute values of the attribute "Relations" of the data unit U1: "Takamiyuratake" obtained at the step S304, such as the relation units "R110001" and "R110003", are obtained, and then at the step S306, all of these relation units $R_i$ are retrieved from the memory device 123 by the retrieval unit 125.

Then, next at the step S307, for all of the relation units $R_i$ obtained at the step S306, the attributes $A_{i1}, \ldots, A_{im}$ which specify the objects of the relationships are obtained, and then at the step S308, the attribute values $V_{ij1}, \ldots, V_{ijl}$ for the attributes $A_{ij}$ obtained at the step S307 which contain the data unit U1 or a part or a whole of the attribute values of the unit data U1, such as "U011001 Text Data 10.14" and "U011001 Text Data 10.7", are obtained.

Then, at the step S309, the data unit U1 as well as sets of the obtained relation units $R_i$, attributes $A_{ij}$, and attributes values $V_{ijk}$ ($R_i$, $A_{ij}$, $V_{ijk}$) are sent to the terminal device 122.

Figure 40:
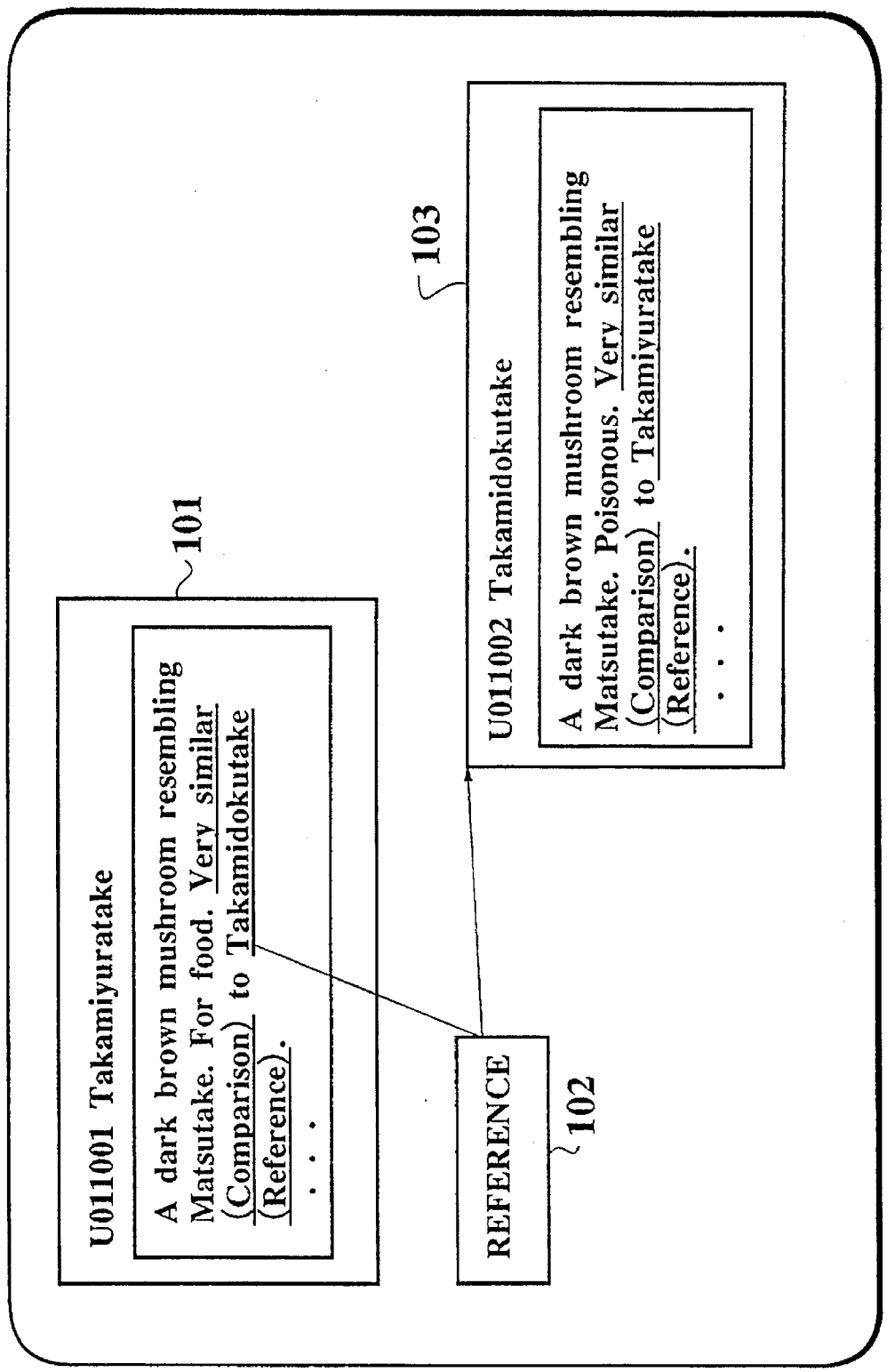
FIG. 40 is an illustration of an exemplary display of data units and their relationship in the document processing system of FIG. 34.
Figure 41:
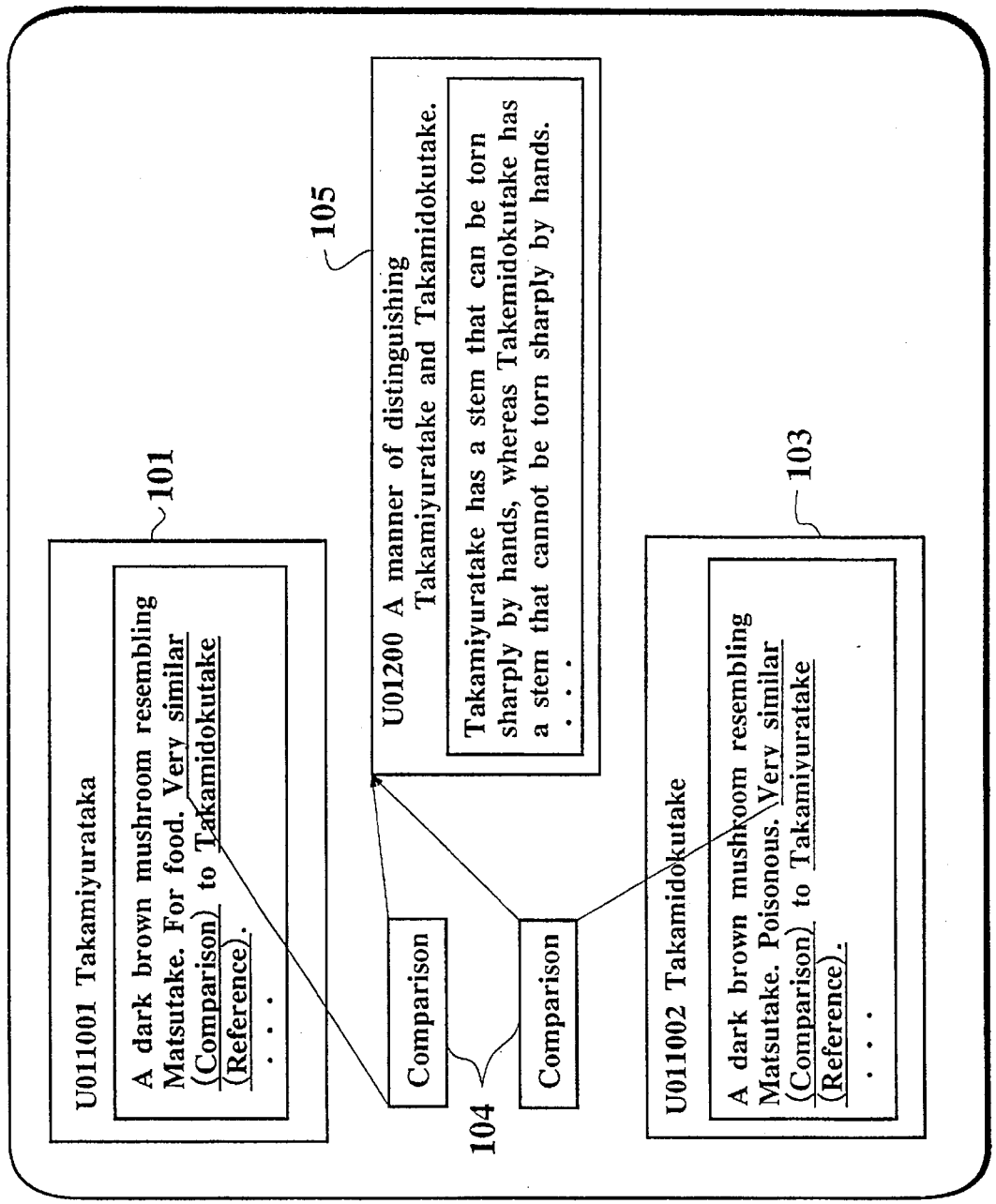
FIG. 41 is an illustration of another exemplary display of data units and their relationship in the document processing system of FIG. 34.

In response, at the step S310, the terminal control unit 129 of the terminal device 122 displays the data unit U1 on the display of the display device 131, along with relation markings on the data unit U1 at positions of all $V_{ijk}$ obtained at the step S308, which indicates the presence of the relationships. Here, the relation marking is given in a form of an underline for a part of the attribute of the data unit U1, while the relation marking is given in a form of an enclosing frame line for the entire data unit U1 or the entire attribute of the data unit U1, as shown in FIGS. 40 and 41.

Figure 39A:
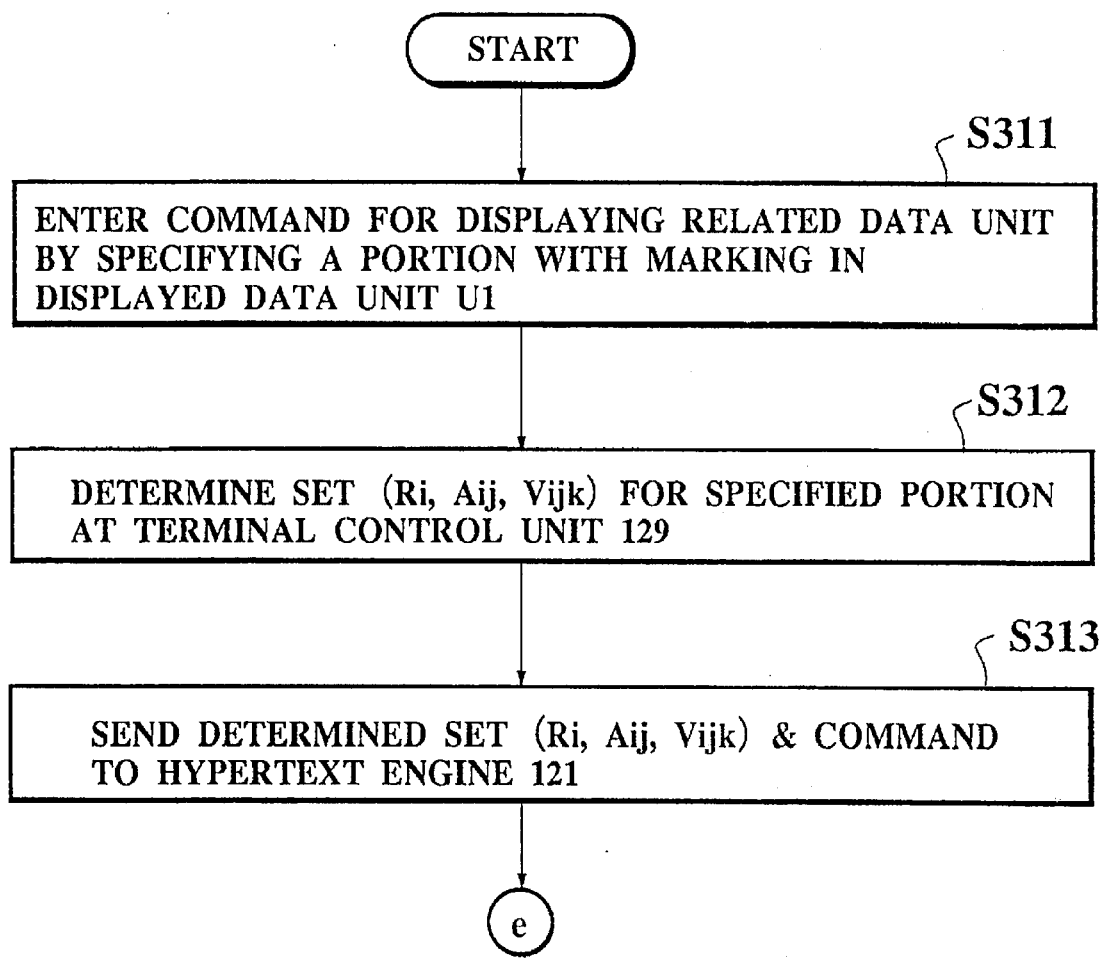
FIG. 39 which consists of FIGS. 39A and 39B is a flow chart for an operation of display of relationships among data units in the document processing system of FIG. 34.
Figure 39B:
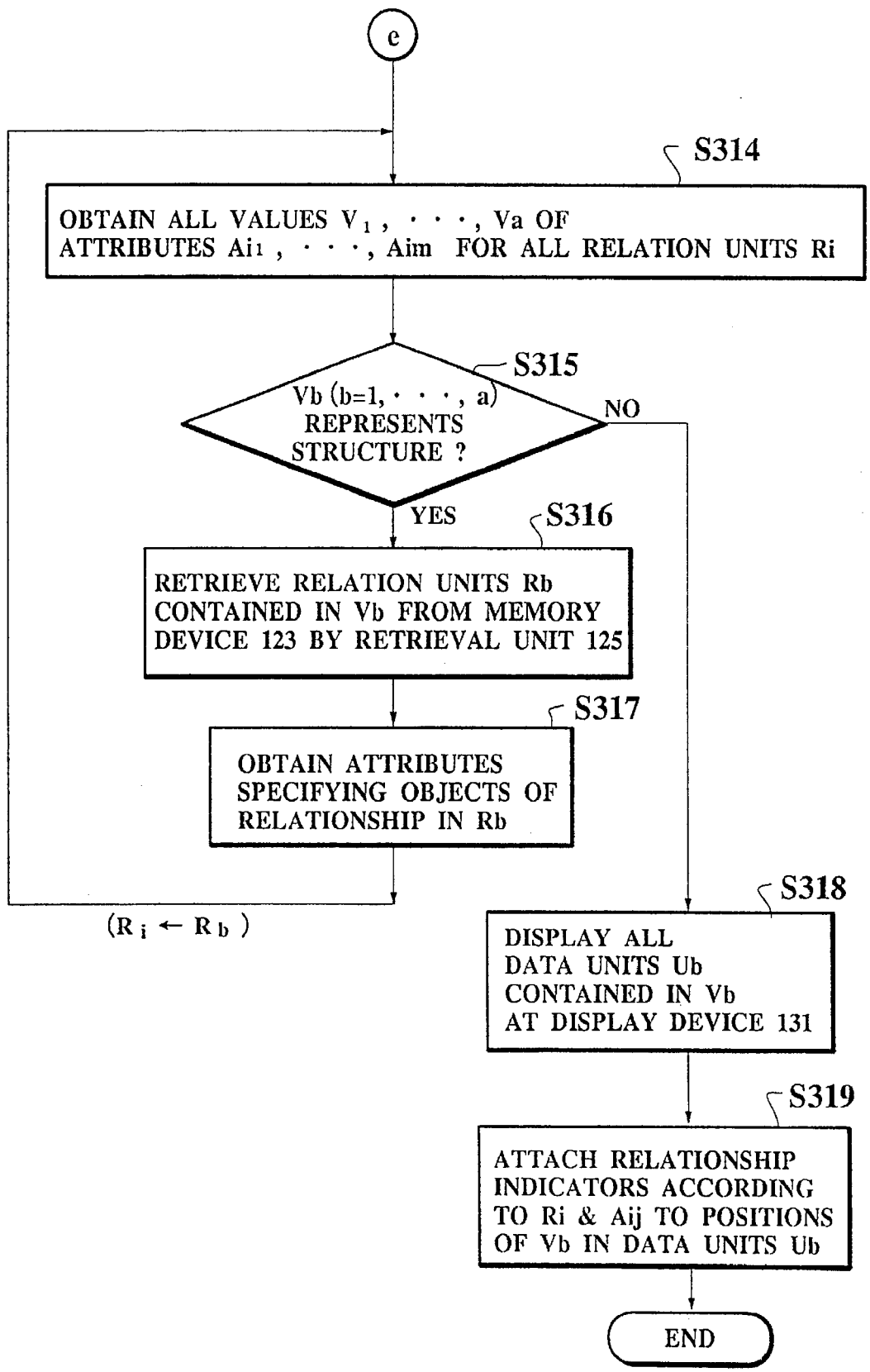

Referring now to the flow chart of FIG. 39, the operation of the display of the relationships among the displayed data units in this third embodiment of a document processing system will be described in detail.

Figure 38:
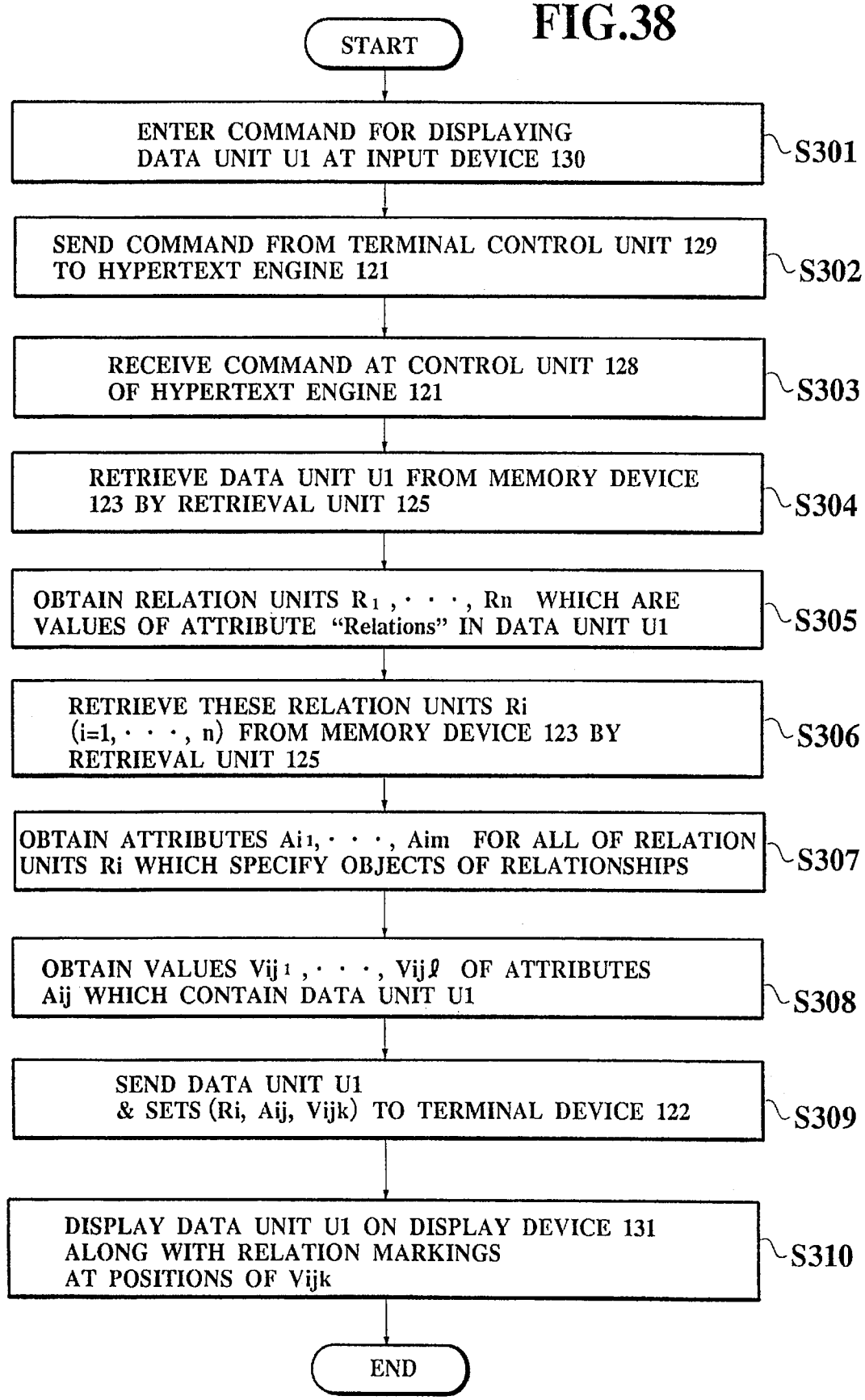
FIG. 38 is a flow chart for an operation of display of data units in the document processing system of FIG. 34.

First, in a state in which the data unit U1 is displayed by means of the operations according to the flow chart of FIG. 38, at the step S311, the user enters the command for displaying the related data unit by specifying one of portion marked by the relation markings displayed on the display of the data unit U1 by using either the keyboard or the mouse.

Then, the terminal control device 129 determines the set of the relation unit, attribute, and attribute value ($R_i$, $A_{ij}$, $V_{ijk}$) corresponding to the specified portion at the step S312, and send this set along with the command for displaying the related data unit to the hypertext engine 121 at the step S313.

Then, next at the step S314, for all of the relation units Ri obtained at the step S308, the control unit 128 obtains all the attribute values Vb (b=1, ..., a) for all the the attributes $A_{i1}, \ldots, A_{im}$ which specify the objects of the relationships.

Then, whether each of the attribute values Vb obtained at the step S314 represents a structure or not is determined at the step S315.

If each attribute value Vb represents a structure, then next at the step S316, the retrieval unit 125 retrieves the relation units Rb contained in each attribute value Vb from the memory unit 123, and at the step S317, the attributes specifying the objects of the relationship represented by the relation units Rb are obtained. Then, the process returns to the step S314 to repeat the same process for the relation units Rb.

If each attribute value Vb does not represents a structure, then next at the step S318, all the data units Ub contained in each attribute value Vb are sent to the terminal device 122, such that the terminal control unit 129 controls the display device 131 to display all the data units Ub.

Then, at the step S319, the relationship indicators for indicating the relationships specified by the relation units $R_i$ and the attributes $A_{ij}$ are attached to the positions of the attribute values Vb in the data units Ub displayed at the step S318.

In the examples of the data units shown in FIGS. 36A, 36B, and 36C and the relation units shown in FIGS. 37A, 37B, and 37C, when the user selects the portion "Takami-dokutake" in the "Text Data" of the data unit U1: "Taka-miyuratake" and enters the command to display the reference target of this portion from the input device 130, as shown in FIG. 40, the relationship indicator 102 for indicating the reference relationship from the portion "Takami-dokutake" in the data unit U1: "U011001" to the data unit "U011002" is displayed along with the data units "U011001" enclosed by a frame line 101 and "U011002" enclosed by a frame line 103. Alternatively, when the user selects the portion "similar" in the "Text Data" of the data unit U1: "U011001", the control unit 128 obtains the attribute value "U011002 Text Data 9.7" from the attribute of the comparison target ("U011001 Text Data 10.7" is to be ignored), and the attribute value "U012001" from the attribute of the comparison content, such that as shown in FIG. 41, the relationship indicator 104 for indicating this comparison relationship is displayed along with the data units "U011001" enclosed by a frame 101, "U011002" enclosed by a frame 103, and "U012001" enclosed by a frame 105.

Here, in this third embodiment, the multi-term relationship is represented by a single relation unit, so that the relationship indicators for the multi-term relationship can be attached by a single action on the user's side.

Now, the example of the data units and relation units for representing the meta-relationship among the structures will be described in detail.

FIG. 42A shows an example of a data unit having the text data describing an owl called "Ezoakafukurou". This data unit has the ID "U013001" as its unique name. Also, the attribute "Relations" contains the attribute values indicating a list of a names (IDs) of the relation units which express the multi-term relationships for that data unit or a part or a whole the attributes of that data unit, such as "R200001".

Similarly, FIG. 42B shows an example of a data unit having the text data describing a rabbit called "Higetobiusagi". This data unit has the ID "U013002" as its unique name. Also, the attribute "Relations" contains the attribute values indicating a list of a names (IDs) of the relation units which express the multi-term relationships for that data unit or a part or a whole the attributes of that data unit, such as "R200001" and "R200002".

Similarly, FIG. 42C shows an example of a data unit having the text data describing a plant called "Taka-miusuyukisou". This data unit has the ID "U013003" as its unique name. Also, the attribute "Relations" contains the attribute values indicating a list of a names (IDs) of the relation units which express the multi-term relationships for that data unit or a part or a whole the attributes of that data unit, such as "R200002".

FIG. 42D shows an example of a data unit having the text data entitled "The ecological system of the Takami highland". This data unit has the ID "U013005" as its unique name. Also, the attribute "Relations" contains the attribute values indicating a list of a names (IDs) of the relation units which express the multi-term relationships for that data unit or a part or a whole the attributes of that data unit, such as "R200005".

FIG. 43A shows an example of a relation unit having the ID of "R200001" for representing a relationship of the food chain between that which eats "U013001" (i.e., "Ezoakafukurou" of FIG. 42A) and that which is eaten "U013002" (i.e., "Higetobiusagi" of FIG. 42B). Also, the attribute "Relations" contains the attribute values indicating a list of a names (IDs) of the relation units for the structures which express the multi-term relationships for that relation unit or a part or a whole the attributes of that relation unit, such as "R200005".

Similarly, FIG. 43B shows an example of a relation unit having the ID of "R200002" for representing a relationship of the food chain between that which eats "U013002" (i.e., "Higetobiusagi" of FIG. 42B) and that which is eaten "U013003" (i.e., "Takamiusuyukisou" of FIG. 42C). Also, the attribute "Relations" contains the attribute values indicating a list of a names (IDs) of the relation units for the structures which express the multi-term relationships for that relation unit or a part or a whole the attributes of that relation unit, such as "R200005".

FIG. 43C shows an example of a relation unit having the ID of "R200005" for representing a reference relationship between the reference source "U013005 Text Data 23.22) and the reference target "R200001 Structure" and "R200002 Structure", which is the meta-level relationship between the structures. This reference relationship represented by the relation unit of FIG. 43C indicates that the reference is made from 22 letters from the 23rd word in the attribute "Text Data" of the data unit "U013005" (i.e., the data unit "The ecological system of the Takami highland" shown in FIG. 42D), which are the letter series "unique ecological system", to "R200001 Structure" and "R20002 Structure", i.e., the structures formed by the food chain relationships represented by the relation units R20001 and R200002 shown in FIGS. 43A and 43B.

In this case, the operation of the display of the relationships among the data units described above in conjunction with the flow chart of FIG. 39 will proceeds as follows.

Namely, when the data unit "The ecological system of the Takami highland" shown in FIG. 42D is displayed on the display device 131 of the terminal device 122 by means of the steps S301 to S310 as described above, the portion "unique ecological system" will be displayed with the relation marking indicating the presence of the reference relationship.

Then, when the user selects this portion and enters the command for displaying the related data units from the input device 131, at the step S311, the terminal control device 129 carries out the steps S312 to S314 as described above. In this case, the attribute values obtained by the step S314 will be "R20001 Structure" and "R200002 Structure". Since these attribute values represent structures, the steps S316 to S317 will be carried out after the step S315 as follows.

Namely, at the step S316, the retrieval unit 125 retrieves the relation units "R20001" and "R200002" from the memory unit 123.

Then, at the step S317, the objects contained in the attribute values of the attributes expressing the multi-term relationships represented by the relation units "R200001" and "R200002" are obtained. In this case, the attribute "that which eat" has the values "U013001" and "U013002", while the attribute "that which is eaten" has the values "U013002" and "U013003".

Then, the step S314 is repeated for the relation units listed in the attribute "Relations" of these objects "U013001", "U013002", and "U013003". Here, those relation units which are already retrieved such as "R200001" and "R200002" will not be retrieved again.

Figure 44:
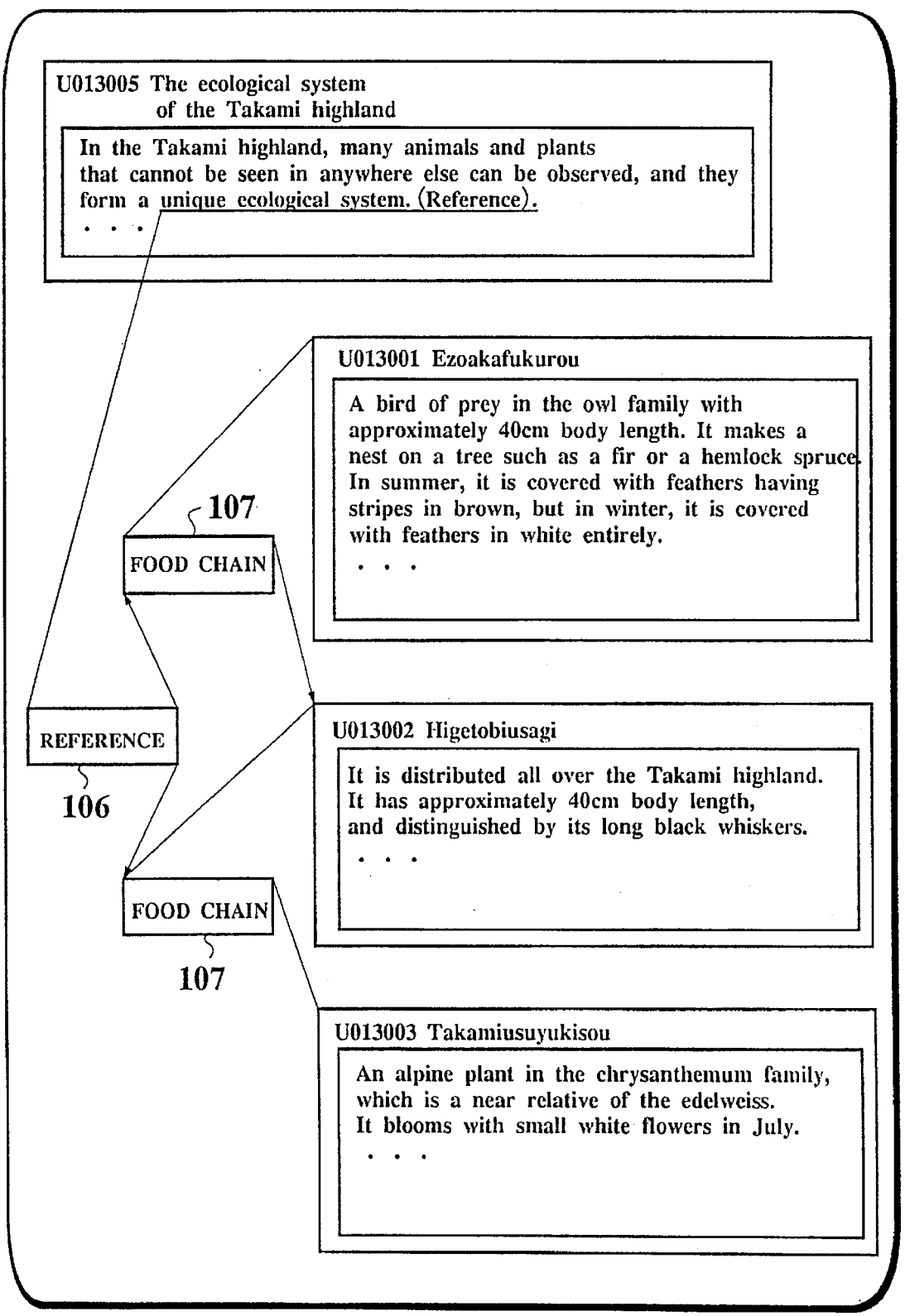
FIG. 44 is an illustration of an exemplary display of data units and their relationship in the document processing system of FIG. 34, for a case of using structures as objects of relationships.

Finally, by means of the steps S318 to S319, the relation units "R200001" and "R200002" as well as their object data units "U013001", "U013002", and "U013003" are sent to the terminal control unit 129 of the terminal device 122, such that as shown in FIG. 44, the data units "U013001", "U013002", and "U013003" are displayed along with the relationship indicator 106 for indicating the reference relationship and the relationship indicators 107 for indicating the food chain relationship.

Figure 45:
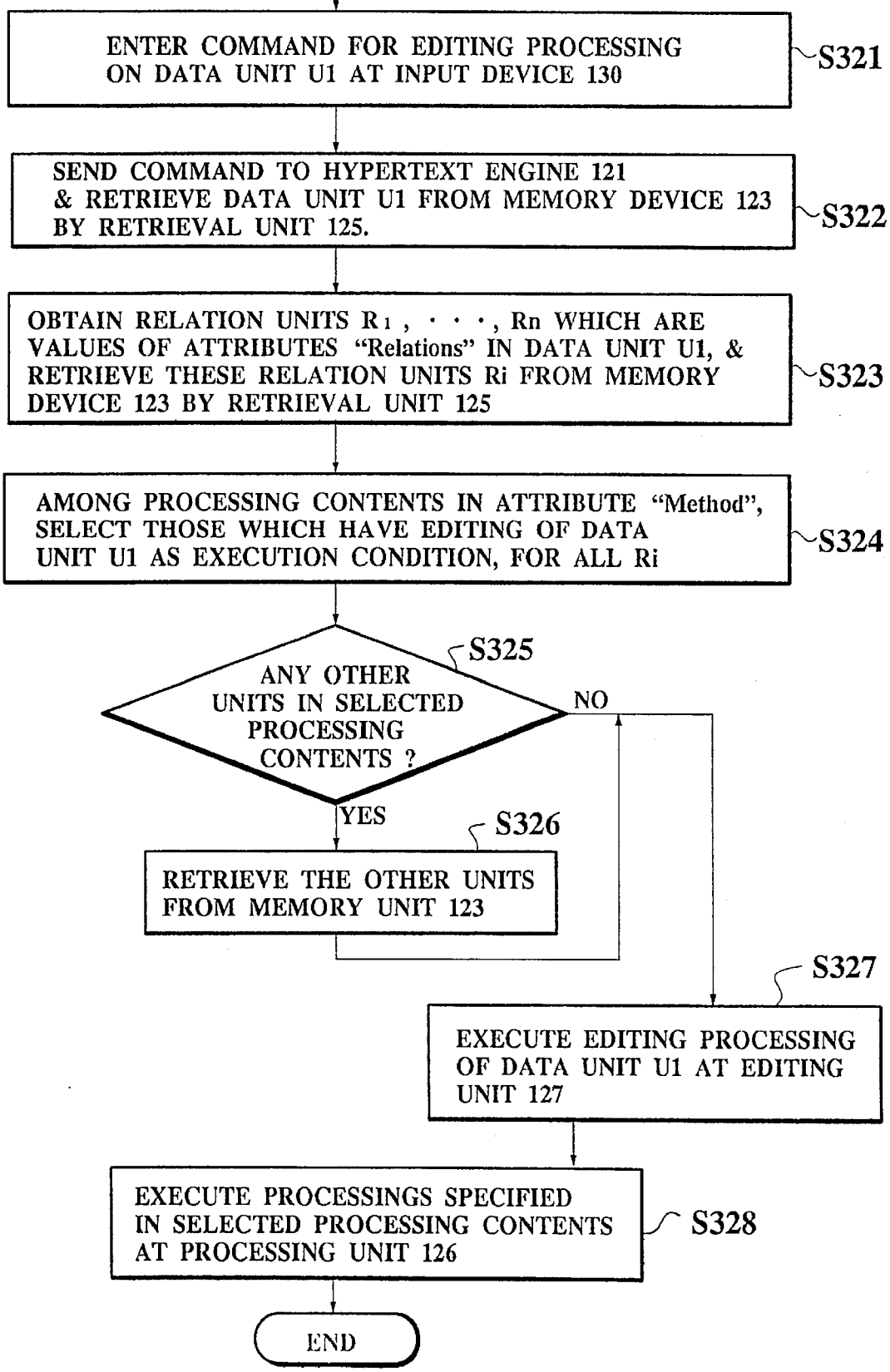
FIG. 45 is a flow chart for an operation of executing a processing on displayed data units in the document processing system of FIG. 34.

Referring now to the flow chart of FIG. 45, the operation of executing some processing on the displayed data unit in this third embodiment of a document processing system will be described in detail. Here, the description will be given by using the editing processing as an example of the processing to be executed.

First, at the step S321, in a state in which the data unit U1 is displayed by means of the operation according to the flow chart of FIG. 38, the user enters the command for the editing processing of the displayed data unit U1 from the input device 131.

Then, at the step S322, as this command is sent to the hypertext engine 121 from the terminal control unit 129, the retrieval unit 125 retrieves this data unit U1 from the memory device 123.

Then, at the step S323, the relation units enlisted in the attribute "Relations" of this data unit U1 are obtained, and the retrieval unit 125 retrieves these relation units from the memory device 123.

Next, at the step S324, among the processing contents enlisted in the attribute "Method" of the data unit U1 and all the relation units $R_i$ obtained at the step S323, those which have the editing of the data unit U1 as the execution condition are selected.

Then, at the step S325, whether there is any other contents selected at the step S324 or not is determined.

In a case of the affirmative, next at the step S326, the other data units or relation units appearing in the selected processing contents are retrieved from the memory unit 123. Otherwise, the process proceeds directly to the step S327.

Next at the step S327, the editing unit 127 executes the editing processing of the data unit U1.

Finally, at the step S328, the processing unit 126 executes the processings specified in the processing contents selected at the step S324 on the other data units or relation units retrieved at the step S326.

Thus, for example, in a case of editing the data unit of "Takamiyuratake" shown in FIG. 36A, the attribute "Method" of this data unit specifies that "In a case of editing, the corresponding portions of the relation units must be changed.", and the attribute "Method" of the relation unit shown in FIG. 37C, which is one of the relation unit of this data unit, specifies that "In a case of editing any one of U011001, U011002, and U012001, all three must be displayed".

Accordingly, when the data unit U011001 is edited to change the position of the portion "similar" to start from the 44th word, "U011001 Text Data 10.7" specified in the attribute "comparison target" in the relation unit shown in FIG. 37C must be changed to "U011001 Text Data 44.7", correspondingly, while displaying the data units of "U011002" and "U012001" along with this data unit of "U011001".

Similarly, in a case the data unit "U011001" is edited to delete the description concerning "Takamidokutake" in this data unit "U011001", the relation unit "R110001" shown in FIG. 37A which represents the reference relationship between this deleted description and the data unit "U011002" must be deleted.

Figure 46:
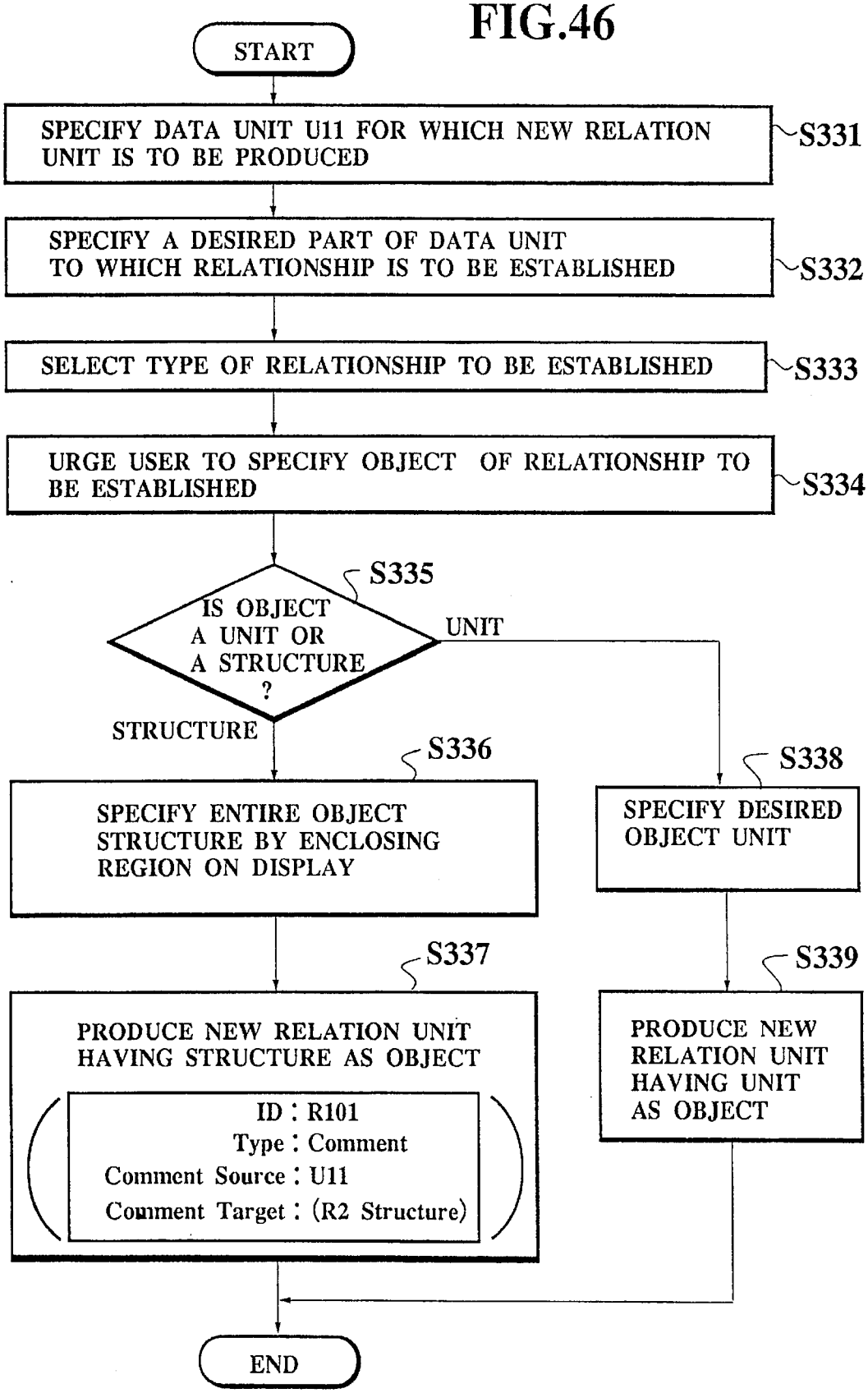
FIG. 46 is a flow chart for an operation of producing a new relation unit in the document processing system of FIG. 34.

Referring now to the flow chart of FIG. 46, the operation of producing a new relation unit in this third embodiment of a document processing system will be described in detail. Here, the description will be given for a case of specifying a structure formed by the multi-term relationships as the object of the meta-level relationship with a given data unit. For example, a new relation unit is to be produced for the relationship between the data unit for a document and the data unit for a comment to be attached to a specified part of the document, just as in the first embodiment described above, where the document has a hierarchical structure formed by chapters and sections.

Figure 47:
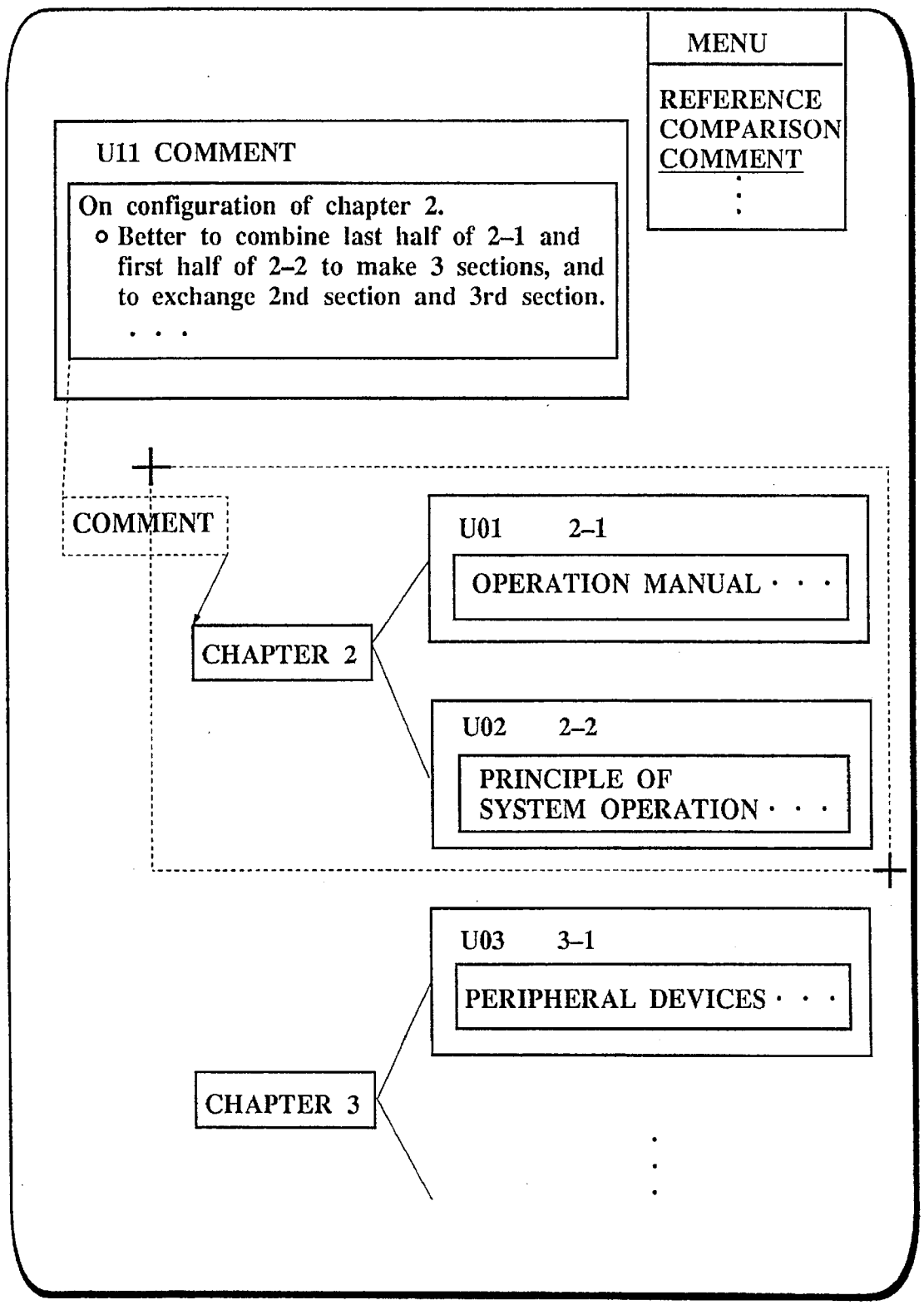
FIG. 47 is an illustration of another exemplary display of data units and their relationship in the document processing system of FIG. 34, for a case of producing a new relation unit.

First, at the step S331, the user specifies the data unit U11 for which a new relation unit is to be produced. For example, this data unit U11 contains the comment to be attached to the document, as shown in FIG. 47.

Then, at the step S332, the user specifies a desired part of the data unit specified at the step S331, in a case the relationship is to be established with only a part of the data unit specified at the step S331.

Then, at the step S333, a type of a relationship to be established, such as comment, is specified by using a menu enumerating various possible relationship types which is displayed on the display device 131.

Next, at the step S334, the system urges the user to specify the object of the relationship is to be established.

In response, next at the step S335, the user determines whether the desired object of the relationship to be established is a structure or a unit.

In a case the object is a structure such as the entire chapter 2, next at the step S336, the user specifies a region on the display in which the entire object structure is shown, by using a cursor for example, as shown in FIG. 47 in which the entire chapter 2 is specified by being enclosed within a dashed line enclosure. Then, at the step S337, a new relation unit having the specified structure as the object of the relationship is produced. For example, the relationship for uniting all the sections of the chapter 2 is represented by a relation unit R2, the attribute "Comment target" in a newly produced relation unit will have the value "R2 Structure", while the attribute "Comment source" will have the value "U11", such that the relationship indicator for this comment relationship will be displayed, as shown in FIG. 47.

On the other hand, in a case the object is a unit such as the section 1 of the chapter 2, next at the step S338, the user specifies a region on the display in which the desired object unit is shown, and at the step S339, a new relation unit having the specified unit as the object of the relationship is produced. Here, by specifying more than one units as the object of the relationship at the step S338, the relation unit representing the relationship among more than three terms can be produced at the step S339.

It is to be noted that the procedure similar to that described above is also applicable to a case of establishing a meta-level relationship between structures.

It is also to be noted that by expressing a relationship among more than two terms by a single relation unit as described above, the processings for more than two units related by such a multi-term relationship can be specified in a single relation unit, so that the managing of the units in the document processing system can be made more efficiently. Here, the multi-term relationship may involve an auto-regressive relationship from one unit to the same unit, so that a number of units related by the multi-term relationship could be only two.

It is also to be noted that the data to be processed in the document processing system may includes the data in a form other than the document using text data used in the above description of the third embodiment, such as speech data, figure data, table data, picture data, video data, graphic data, etc.

In a case of using these data forms, it is necessary to define a scale to describe a position of each data and a manner of specifying a portion of each data in order to specify the position and range of the portion of the data to be the object of the multi-term relationship. For example, in a case of using a still picture, the upper left corner may be chosen as an origin and a number of picture elements from the origin may be used as a scale, and the range may be specified in terms of sizes of shapes such as rectangle, circle, ellipse, etc. In a case of using speech data, a starting time of the speech data may be chosen as an origin and a time elapse since the origin may be used as a scale, and the range may be specified in terms of a length of a period of time. Moreover, when the frequency band is to be taken into account, the scale may be set up in two dimension formed by a time axis and a frequency axis, such that the range can be specified in terms of sizes of shapes on such a two dimensional scale. In a case of using dynamic images, a number of frames (or a time) and vertical and horizontal positions of each frame may be used to set up a three dimensional scale, such that the range can be specified in terms of positions and shapes of three dimensional volumes. In a case of using figure data, the figure elements may be labelled by a consecutive figure element number, such that the range can be specified by using the figure element numbers.

It is further to be noted that the relation unit for representing a multi-term relationship used in this third embodiment may be produced by using a high level language, such that it can be decomposed into two-term relationships by using a method of logic programming at a time of the compiling, so as to make it easier to manage the data units to maintain the consistency among the data units.

As described, according to this third embodiment of a document processing system, it becomes possible to provide a document processing system capable of dealing not only with the usual two-erm relationship but also with multi-term relationships among different parts of a document to be processed.

As a consequence, when there is a multi-term relationship among one parent unit and two child units sharing the same parent unit, it is possible in this third embodiment to make a direct reference from one of the child units to another one of the child units having the same parent unit, so that the operation for looking up of the reference can be simplified considerably.

Moreover, according to this third embodiment, it also becomes possible to provide a document processing system capable of dealing also with meta-level relationships among different structures in a document to be processed.

Thus, according to this third embodiment, the types of relationships that can be dealt with in the document processing system are enormously expanded compared with the conventional document processing system, and therefore it is possible to enhance the capacity of the document processing system considerably.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A document processing system, comprising:

editor means for writing, editing and displaying a document to be revised from an old version to a new version, version data indicating a modification made in the document between the new version and the old version and including an explanation of the modification, and a comment on the document; and data managing means for retrieving and storing document data by linking the document in the new version, the document in the old version, the comment on the document, and the version data;

wherein when the editor means is activated to create a new comment while displaying the document, the data managing means automatically links the new comment created at the editor means with the document currently displayed at the editor means as an attached comment, and when the editor means is activated to revise the document from the old version to the new version while displaying the old version of the document along with at least one attached comment, the data managing means automatically links the at least one attached comment with the document in the new version as one or more influencing comments corresponding respectively to said at least one attached comment.

2. The document processing system of claim 1, wherein the editor means further comprises:

document editor means for writing, editing, and displaying the document;

comment editor means for creating, editing, and displaying the comment; and version data display means for displaying the version data.

3. The document processing system of claim 2, wherein when the comment editor means is activated to create a new comment while the document editor means displays the document, the data managing means automatically links the new comment produced at the comment editor means with the document currently displayed at the document editor means.

4. The document processing system of claim 2, wherein when the comment editor means is activated to display the comment attached to the document while the document editor means displays the document, the comment editor means displays the comment which is linked with the document currently displayed at the document editor means in the data managing means.

5. The document processing system of claim 2, wherein, when the document editor means is activated to edit the document, the data managing means automatically creates a new version of the edited document, produces the version data for the new version indicating a modification made in the edited document by the document editor means, and links the produced version data for the new version with the edited document in the new version.

6. The document processing system of claim 5, wherein the data managing means produces the version data by recording a sequence of editing operations applied to the document by the document editor means as an indication of the modification made in the edited document.

7. The document processing system of claim 2, wherein when the document editor means is activated to edit the document while the comment editor means displays the comment attached to the document, the data managing means automatically links the comment currently displayed at the comment editor means with the edited document so as to set the comment currently displayed at the comment editor means as a influencing comment.

8. The document processing system of claim 7, wherein, when the comment editor means is activated to display a comment which is related to the modification made in the document while the document editor means displays the document, the comment editor means displays the influencing comment which is linked with the document currently displayed at the document editor means in the data managing means.

9. The document processing system of claim 2, wherein when the version data display means is activated to display the version data while the document editor means is displaying the document in a present version, the version data display means displays the version data for the present version which is linked with the document in the present version in the data managing means.

10. The document processing system of claim 1, wherein the editor means can be controlled to simultaneously display all the document data including the document in the new and old versions, the comment attached to the document, and version data indicating a modification made in the document between the new version and the old version.

11. The document processing system of claim 1, wherein the editor means includes a plurality of independent editor elements in correspondence to a plurality of versions of the document.

12. The document processing system of claim 11, wherein said plurality of independent editor elements can be controlled to simultaneously display a plurality of document data for the document in different versions.

13. The document processing system of claim 1, wherein when the editor means specifies a specific version of the document, the data managing means retrieves the document data in the specified version by tracing a plurality of versions of the document up to the specified version in the document data.

14. A method of document processing, comprising the steps of:

(a) displaying a document in an old version which is to be revised into a new version;

(b) automatically linking a comment created in relation to the document displayed at the step (a), as an attached comment;

(c) displaying the document in the old version along with the comment linked as the attached comment at the step (b);

(d) revising the old version of the document displayed at step (c) by making a modification to the old version of the document according to the comment displayed at the step (c), to produce the new version;

(e) producing version data including information about the revised document and indicating the modification made in the document between the new version and the old version at the step (d) and including an explanation of the modification entered by the user; and (f) managing the document, modifications thereto, and version data by automatically linking the comment displayed at the step (c) with the document in the new version as an influencing comment for the document in the new version, and automatically linking version data produced in step (e) with the document in the new version.

* * * * *